(12) United States Patent
Fujita

(10) Patent No.: US 12,090,984 B2
(45) Date of Patent: Sep. 17, 2024

(54) VEHICLE AND VEHICLE CONTROL METHOD

(71) Applicant: TOYOTA JIDOSHA KABUSHIKI KAISHA, Aichi-ken (JP)

(72) Inventor: Yoshitaka Fujita, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 204 days.

(21) Appl. No.: 17/970,997

(22) Filed: Oct. 21, 2022

(65) Prior Publication Data

US 2023/0202440 A1 Jun. 29, 2023

(30) Foreign Application Priority Data

Dec. 23, 2021 (JP) .................................. 2021-209152

(51) Int. Cl.
*B60T 8/28* (2006.01)
*B60T 8/17* (2006.01)

(52) U.S. Cl.
CPC . *B60T 8/28* (2013.01); *B60T 8/17* (2013.01)

(58) Field of Classification Search
CPC ................. B60T 8/28; B60T 8/17; B60T 8/26
See application file for complete search history.

(56) References Cited

U.S. PATENT DOCUMENTS

| | | | |
|---|---|---|---|
| 2018/0086209 A1* | 3/2018 | Jeon | ........................... B60T 8/17 |
| 2020/0353930 A1* | 11/2020 | Lee | ..................... B60W 10/188 |
| 2020/0361318 A1* | 11/2020 | Lee | ............................ B60T 1/10 |
| 2021/0114569 A1 | 4/2021 | Yamamoto | |

FOREIGN PATENT DOCUMENTS

JP 2019-177736 A 10/2019

* cited by examiner

Primary Examiner — Jacob M Amick
(74) Attorney, Agent, or Firm — Sughrue Mion, PLLC

(57) ABSTRACT

The electronic control unit is configured to, when braking by the braking device is performed in a deceleration state where the coasting deceleration is equal to or less than a threshold value, distribute target braking force corresponding to requested deceleration to front-wheel braking force and rear-wheel braking force in accordance with a front-rear distribution ratio determined from the requested deceleration and the braking force distribution characteristics, and when the braking is performed in a deceleration state where the coasting deceleration is higher than the threshold value, distribute corrected target braking force to the front-wheel braking force and the rear-wheel braking force in accordance with the front-rear distribution ratio determined from total deceleration and the braking force distribution characteristics, the corrected target braking force being a sum of the target braking force and braking force that generates the coasting deceleration.

8 Claims, 12 Drawing Sheets

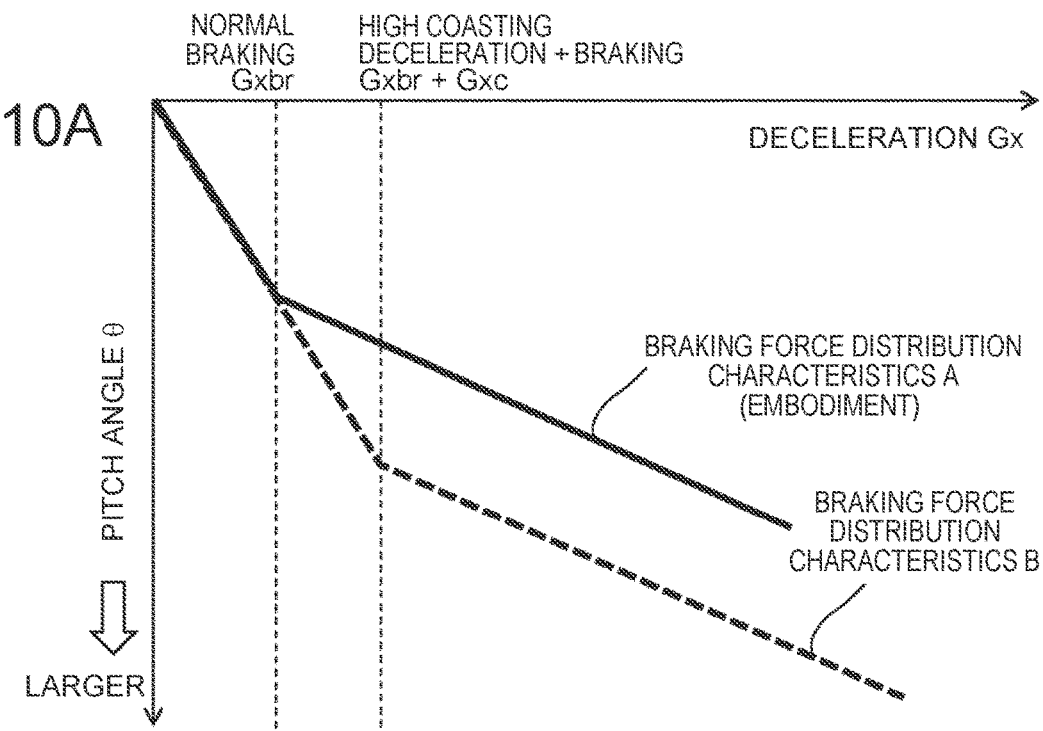
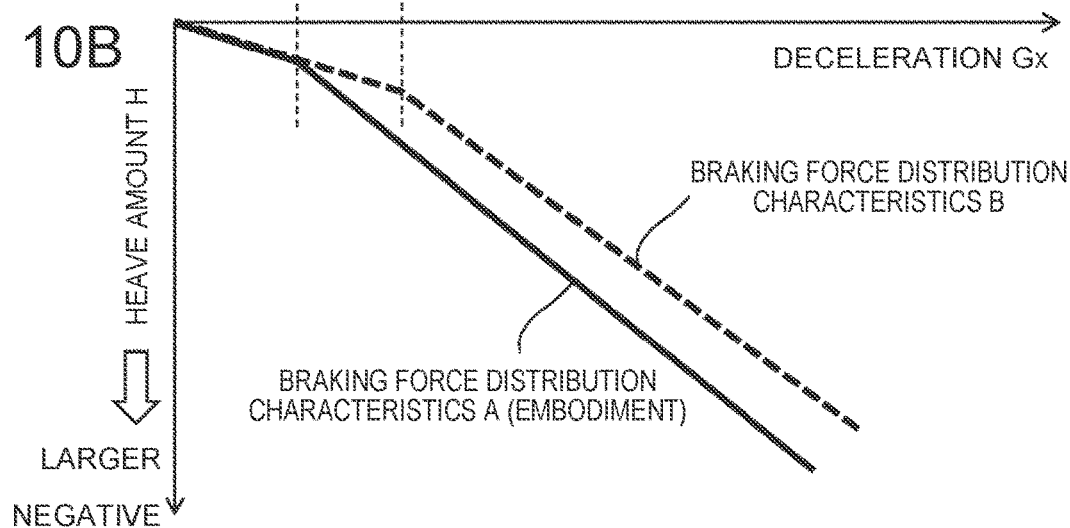

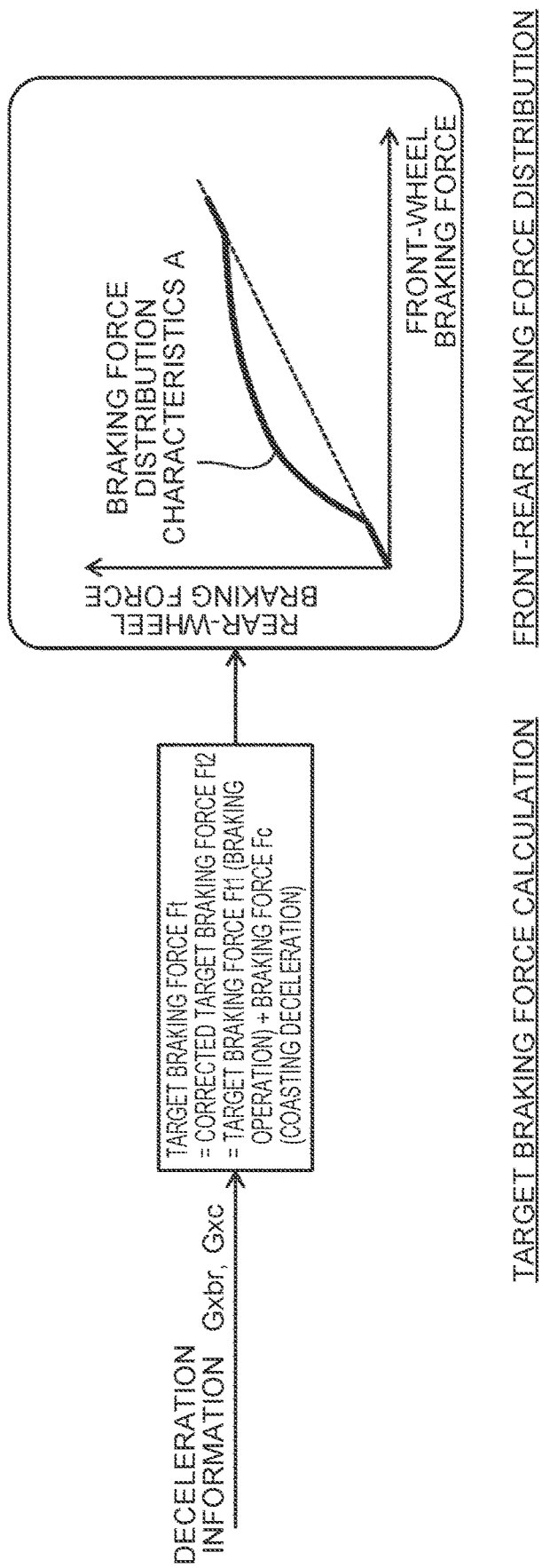

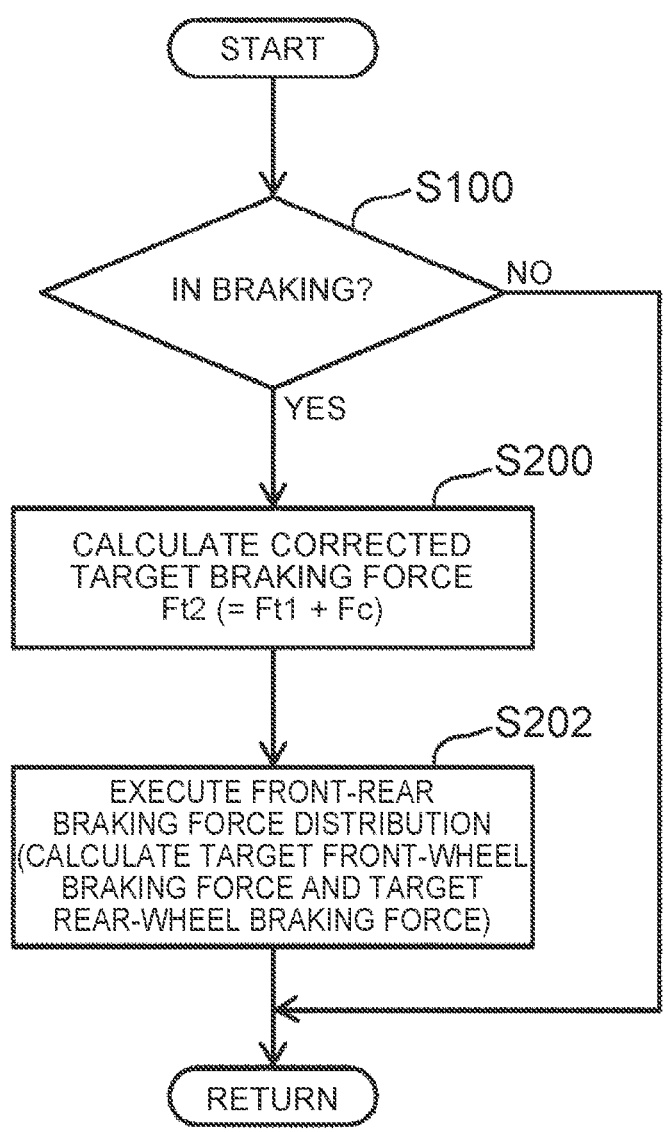

VEHICLE AND VEHICLE CONTROL METHOD

CROSS-REFERENCE TO RELATED APPLICATION

This application claims priority to Japanese Patent Application No. 2021-209152 filed on Dec. 23, 2021, incorporated herein by reference in its entirety.

BACKGROUND

1. Technical Field

The present disclosure relates to a vehicle and a vehicle control method.

2. Description of Related Art

Japanese Unexamined Patent Application Publication No. 2019-177736 discloses a braking control device for a vehicle. The braking control device calculates a target front-rear braking force distribution ratio that is a target value of a front-rear braking force distribution ratio based on a target pitch angle of a vehicle when the vehicle is braked, and performs attitude control by operating the braking device based on the calculated target front-rear braking force distribution ratio.

SUMMARY

Incidentally, some vehicles include a braking device that can change a front-rear distribution ratio of wheel braking force in accordance with braking force distribution characteristics in which the front-rear distribution ratio varies depending on vehicle deceleration, and a decelerator that generates coasting deceleration on the vehicles. When such vehicles are configured to determine the front-rear distribution ratio based on requested deceleration in response to a braking request to the braking device in accordance with the braking force distribution characteristics, the following issue arises. Specifically, when braking by the braking device is performed in a deceleration state where high coasting deceleration is generated, it may be difficult to attain a desired front-rear distribution ratio corresponding to the vehicle deceleration that is actually generated.

The present disclosure has been made in view of the above issue, and an object of the present disclosure is to make it possible to appropriately attain, even when braking by the braking device is performed in a deceleration state where high coasting deceleration is generated, a desired front-rear distribution ratio corresponding to the vehicle deceleration that is actually generated.

A vehicle according to an aspect of the present disclosure includes a braking device, a decelerator, and an electronic control unit configured to control the braking device and the decelerator. The braking device is configured to change a front-rear distribution ratio of wheel braking force in accordance with braking force distribution characteristics in which the front-rear distribution ratio varies depending on vehicle deceleration. The decelerator is configured to generate coasting deceleration. The electronic control unit is configured to, when braking by the braking device is performed in a deceleration state where the coasting deceleration is equal to or less than a threshold value, distribute target braking force corresponding to requested deceleration to front-wheel braking force and rear-wheel braking force in accordance with a front-rear distribution ratio that is determined from the requested deceleration based on a braking request to the braking device and the braking force distribution characteristics. The electronic control unit is configured to, when the braking is performed in a deceleration state where the coasting deceleration is higher than the threshold value, distribute corrected target braking force that is the sum of the target braking force and braking force that generates the coasting deceleration to the front-wheel braking force and the rear-wheel braking force, in accordance with the front-rear distribution ratio determined from total deceleration that is the sum of the requested deceleration and the coasting deceleration and the braking force distribution characteristics.

A vehicle according to another aspect of the present disclosure includes a braking device, a decelerator, and an electronic control unit configured to control the braking device and the decelerator. The braking device is configured to change a front-rear distribution ratio of wheel braking force in accordance with braking force distribution characteristics in which the front-rear distribution ratio varies depending on vehicle deceleration. The decelerator is configured to generate coasting deceleration. The electronic control unit is configured to, when braking by the braking device is performed, distribute corrected target braking force to front-wheel braking force and rear-wheel braking force in accordance with total deceleration that is the sum of requested deceleration based on a braking request to the braking device and the coasting deceleration and the braking force distribution characteristics, the corrected target braking force being the sum of target braking force corresponding to the requested deceleration and braking force that generates the coasting deceleration.

A vehicle control method according to an aspect of the present disclosure is a vehicle control method of controlling a vehicle, the vehicle including a braking device configured to change a front-rear distribution ratio of wheel braking force in accordance with braking force distribution characteristics in which the front-rear distribution ratio varies depending on vehicle deceleration, and a decelerator configured to generate coasting deceleration. The vehicle control method includes: distributing, when braking by the braking device is performed in a deceleration state where the coasting deceleration is equal to or less than a threshold value, target braking force corresponding to requested deceleration to front-wheel braking force and rear-wheel braking force in accordance with a front-rear distribution ratio that is determined from the requested deceleration based on a braking request to the braking device and the braking force distribution characteristics; and distributing, when the braking is performed in a deceleration state where the coasting deceleration is higher than the threshold value, corrected target braking force that is the sum of the target braking force and braking force that generates the coasting deceleration to the front-wheel braking force and the rear-wheel braking force, in accordance with the front-rear distribution ratio determined from total deceleration that is the sum of the requested deceleration and the coasting deceleration and the braking force distribution characteristics.

A vehicle control method according to another aspect of the present disclosure is a vehicle control method of controlling a vehicle, the vehicle including a braking device configured to change a front-rear distribution ratio of wheel braking force in accordance with braking force distribution characteristics in which the front-rear distribution ratio varies depending on vehicle deceleration, and a decelerator configured to generate coasting deceleration. The vehicle control method includes: distributing, when braking by the braking device is performed, corrected target braking force to front-wheel braking force and rear-wheel braking force in accordance with total deceleration that is the sum of requested deceleration based on a braking request to the braking device and the coasting deceleration and the braking force distribution characteristics, the corrected target braking force being the sum of target braking force corresponding to the requested deceleration and braking force that generates the coasting deceleration.

According to the present disclosure, the coasting deceleration generated by the decelerator is taken into consideration for the front-rear distribution of the vehicle braking force corresponding to the requested deceleration based on a braking request to the braking device. This makes it possible to appropriately attain, even when braking by the braking device is performed in the deceleration state where high coasting deceleration is generated, a desired front-rear distribution ratio corresponding to the vehicle deceleration that is actually generated.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 10A is an explanatory view of an influence of high coasting deceleration Gxc on the control of the vehicle attitude during braking with use of the braking force distribution characteristics A according to the embodiment;

FIG. 10B is an explanatory view of the influence of the high coasting deceleration Gxc on the control of the vehicle attitude during braking with use of the braking force distribution characteristics A according to the embodiment;

FIG. 13 is a block diagram showing a process flow about the front-rear braking force distribution according to a modification of the embodiment; and FIG. 14 is a flowchart showing a process about the braking force distribution control according to the modification of the embodiment.

DETAILED DESCRIPTION OF EMBODIMENTS

Hereinafter, an embodiment of the present disclosure will be described with reference to the accompanying drawings. When the numerals, such as the number, the quantity, the amount, and the range of the elements, are mentioned in the embodiment illustrated below, the mentioned numerals do not limit the technical ideas according to the present disclosure unless otherwise clarified or unless otherwise clearly and theoretically specified by the numerals.

1. VEHICLE CONFIGURATION EXAMPLE

Figure 1:
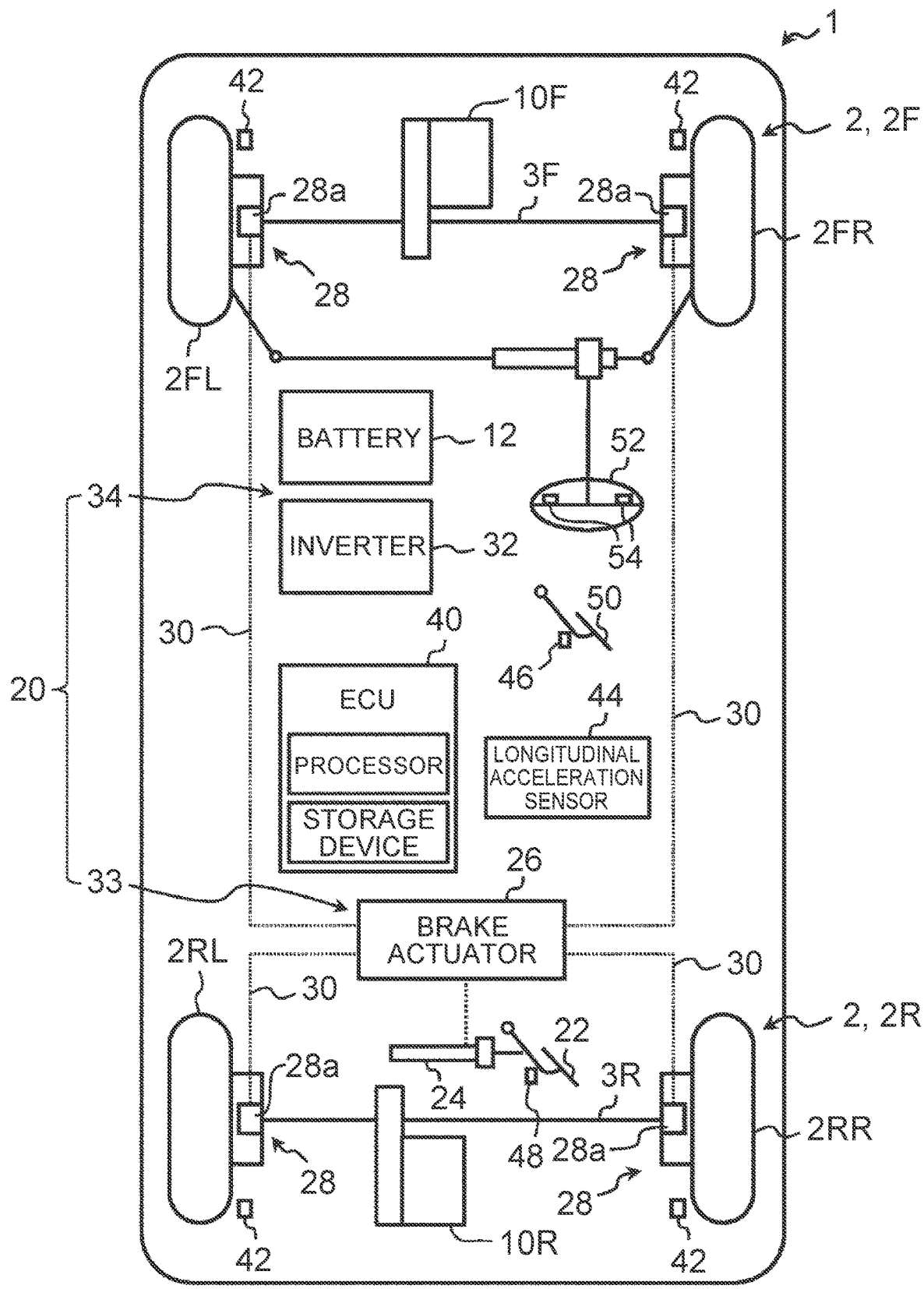
FIG. 1 is a schematic view showing an example of the configuration of a vehicle according to an embodiment.

FIG. 1 is a schematic view showing an example of the configuration of a vehicle 1 according to the embodiment. The vehicle 1 includes four wheels 2. In the following description, a left front wheel, a right front wheel, a left rear wheel, and a right rear wheel are denoted by 2FL, 2FR, 2RL, and 2RR, respectively. The front wheels may also be collectively denoted by 2F, and the rear wheels may collectively be denoted by 2R.

The vehicle 1 includes a front-wheel electric motor 10F that drives the front wheels 2F through a front-wheel drive shaft 3F, and a rear-wheel electric motor 10R that drives the rear wheels 2R through a rear-wheel drive shaft 3R. More specifically, the vehicle 1 is, for example, a battery electric vehicle (BEV) driven by the electric motors 10F, 10R that are operated by electric power supplied from a battery 12. However, the "vehicle" according to the present disclosure may be, for example, a hybrid electric vehicle (HEV) including an internal combustion engine as a motive power source together with the electric motor.

The vehicle 1 includes a braking device 20. The braking device 20 includes a brake pedal 22, a master cylinder 24, a brake actuator 26, brake mechanisms 28, and a hydraulic pipeline 30. The master cylinder 24 generates hydraulic pressure corresponding to pressing force on the brake pedal 22, and supplies the generated hydraulic pressure (brake hydraulic pressure) to the brake actuator 26.

The brake actuator 26 includes a hydraulic circuit (not shown) interposed between the master cylinder 24 and the brake mechanisms 28. The hydraulic circuit includes a pump to boost the brake hydraulic pressure without relying on the master cylinder pressure, a reservoir to store brake fluid, and a plurality of electromagnetic valves.

The brake actuator 26 is connected to the brake mechanisms 28 via the hydraulic pipeline 30. The brake mechanisms 28 are arranged in the respective wheels 2. The brake actuator 26 distributes the brake hydraulic pressure to the brake mechanisms 28 of the respective wheels 2. More specifically, the brake actuator 26 can supply the brake hydraulic pressure to the brake mechanisms 28 of the respective wheels 2 by using the master cylinder 24 or the pump as a pressure source. The brake mechanisms 28 each have a wheel cylinder 28a that is operated in accordance with the supplied brake hydraulic pressure. As the wheel cylinders 28a are operated by the brake hydraulic pressure, brake pads are pressed against brake discs. As a result, frictional braking force is applied to the wheels 2.

Furthermore, the brake actuator 26 can independently regulate the brake hydraulic pressure applied to each of the wheels 2 by controlling various electromagnetic valves provided in the hydraulic circuit. More specifically, the brake actuator 26 has a pressure increase mode for increasing pressure, a retention mode for retaining the pressure, and a pressure reduction mode for reducing the pressure, as control modes of the brake hydraulic pressure. The brake actuator 26 can perform on-off control of various electromagnetic valves to change the control modes of the brake hydraulic pressure for each of the wheels 2. The frictional braking force applied to each of the wheels 2 is set in accordance with the braking pressure supplied to each of the wheel cylinders 28A. With such change in control mode, the brake actuator 26 can independently control the braking force (frictional braking force) of each wheel 2.

The braking device 20 includes a frictional braking device 33 constituted of the master cylinder 24, the brake actuator 26, the brake mechanisms 28, and the hydraulic pipeline 30, as well as a regenerative braking device 34. Specifically, the vehicle 1 includes an inverter 32 to drive the electric motors 10F, 10R. The inverter 32 is controlled based on a command from an ECU 40 described later. Under the control of the inverter 32, the electric motors 10F, 10R function as electric motors that generate vehicle drive torque. The electric motors 10F, 10R also function as generators that generate regenerative torque (negative torque) when being driven with rotation of the wheels 2F, 2R while the vehicle is decelerated. The magnitude of the regenerative torque is controlled by the inverter 32.

The regenerative power generated by the electric motors 10F, 10R is charged in the battery 12. The front wheels 2F are applied with front-wheel regenerative braking force corresponding to the regenerative torque of the front-wheel electric motor 10F, while the rear wheels 2R are applied with rear-wheel regenerative braking force corresponding to the regenerative torque of the rear-wheel electric motor 10R. The regenerative braking device 34 is constituted of the electric motors 10F, 10R, the inverter 32, and the battery 12. The regenerative braking device 34 can control the front-wheel regenerative braking force and the rear-wheel regenerative braking force.

The vehicle 1 further includes the electronic control unit (ECU) 40. The ECU 40 includes a processor, a storage device, and an input-output interface. The input-output interface takes in sensor signals from various sensors fitted to the vehicle 1 and outputs operation signals to the electric motors 10F, 10R, various actuators such as the brake actuator 26, and the inverter 32. The storage device stores various control programs for controlling the various actuators and the inverter 32. The processor reads the control program from the storage device and executes the read program, which allows various controls using the aforementioned actuators and the inverter 32. Note that two or more ECUs 40 may be provided.

The various sensors may include, for example, wheel speed sensors 42, a longitudinal acceleration sensor 44, an accelerator position sensor 46, and a brake position sensor 48. The wheel speed sensors 42 are arranged for the respective wheels 2 and output wheel speed signals corresponding to the rotation speed of the wheels 2. The longitudinal acceleration sensor 44 outputs an acceleration signal corresponding to the longitudinal acceleration (longitudinal G) of the vehicle 1. The accelerator position sensor 46 and the brake position sensor 48 output signals corresponding to the pressing amounts of an accelerator pedal 50 and the brake pedal 22, respectively.

A steering wheel 52 is fitted with a pair of paddle switches 54. The pair of paddle switches 54 is an example of an operation tool that allows a stepwise change of the later-described "coasting deceleration" with a prescribed number of steps by operation of a driver.

2. BRAKING CONTROL

The vehicle 1 can be braked using the braking device 20. The braking is performed in relation to operation of the brake pedal 22 by the driver. For vehicles mounted with a driving assist system or an automated driving system, braking by the braking device 20 is not limited to braking performed in relation to a braking request based on the operation of the brake pedal 22. The braking by the braking device 20 includes automatic braking performed in response to a braking request to the braking device 20 from the relevant system.

In the vehicle 1, it is also possible to generate coasting deceleration Gxc by controlling both or one of the electric motors 10F, 10R so as to generate regenerative torque in a coasting travel state. The term "coasting travel state" herein refers to a deceleration state where the accelerator pedal 50 is set to off and the brake pedal 22 is also set to off (i.e., in the travel state where no driving force is transmitted to the wheels 2). This use of regenerative torque to generate the coasting deceleration Gxc is also referred to as "accelerator off regeneration". However, the accelerator off regeneration may be executed when the operation amount (pressing amount) of the accelerator pedal 50 is zero, and be also executed during vehicle deceleration when the accelerator operation amount is less than a prescribed operation amount that is larger than zero. The accelerator off regeneration is terminated, for example, when the accelerator pedal 50 is pressed for acceleration.

As described above, the accelerator off regeneration is performed in the vehicle 1 to generate the coasting deceleration Gxc. Therefore, in an example of the vehicle 1, the electric motors 10F, 10R, the inverter 32, and the battery 12 correspond to the regenerative braking device 34 included in the braking device 20, as well as to the "decelerator" that generates the coasting deceleration. For vehicles mounted with a driving assist system or an automated driving system, generation of the coasting deceleration is not limited to generation associated with the operation of the accelerator pedal 50, and also includes generation that is automatically performed based on a request from the relevant system.

2-1. Braking Force Distribution Characteristics

The braking device 20 with the above configuration can change a front-rear distribution ratio α of the wheel braking force (braking force of the front wheels 2F and the rear wheels 2R). In the present embodiment, as the braking force distribution characteristic of the braking force applied to the front wheels 2F and the rear wheels 2R by the braking device 20, the "braking force distribution characteristics in which the front-rear distribution ratio α varies depending on vehicle deceleration Gx" is used.

Specifically, as described below, in order to better control the attitude of the vehicle against the vehicle deceleration Gx, the braking force distribution characteristics A (see FIG. 7) in consideration of a load movement of the vehicle 1 generated during braking, is used as an example of the "braking force distribution characteristics in which the front-rear distribution ratio α varies depending on the vehicle deceleration Gx".

When the braking force is generated in the front wheels 2F and the rear wheels 2R, reaction force of suspensions 4F, 4R (see FIG. 2 described later) corresponding to the generated braking force is generated. When the generated suspension reaction force changes, the vehicle attitude during braking (also referred to as "vehicle braking attitude") changes. The suspension reaction force can be controlled by regulating the front-rear distribution ratio α of the braking force.

Therefore, in the present embodiment, in order to use the suspension reaction force to achieve a vehicle braking attitude that gives an occupant an intense braking feeling (for example, deceleration feeling and a sense of safety for braking, to be specific), the braking force distribution control in consideration of the vehicle attitude is executed. In the braking force distribution control, the front-rear distribution ratio α of the braking force is changed depending on the region of a requested deceleration Gxr.

Figure 2:
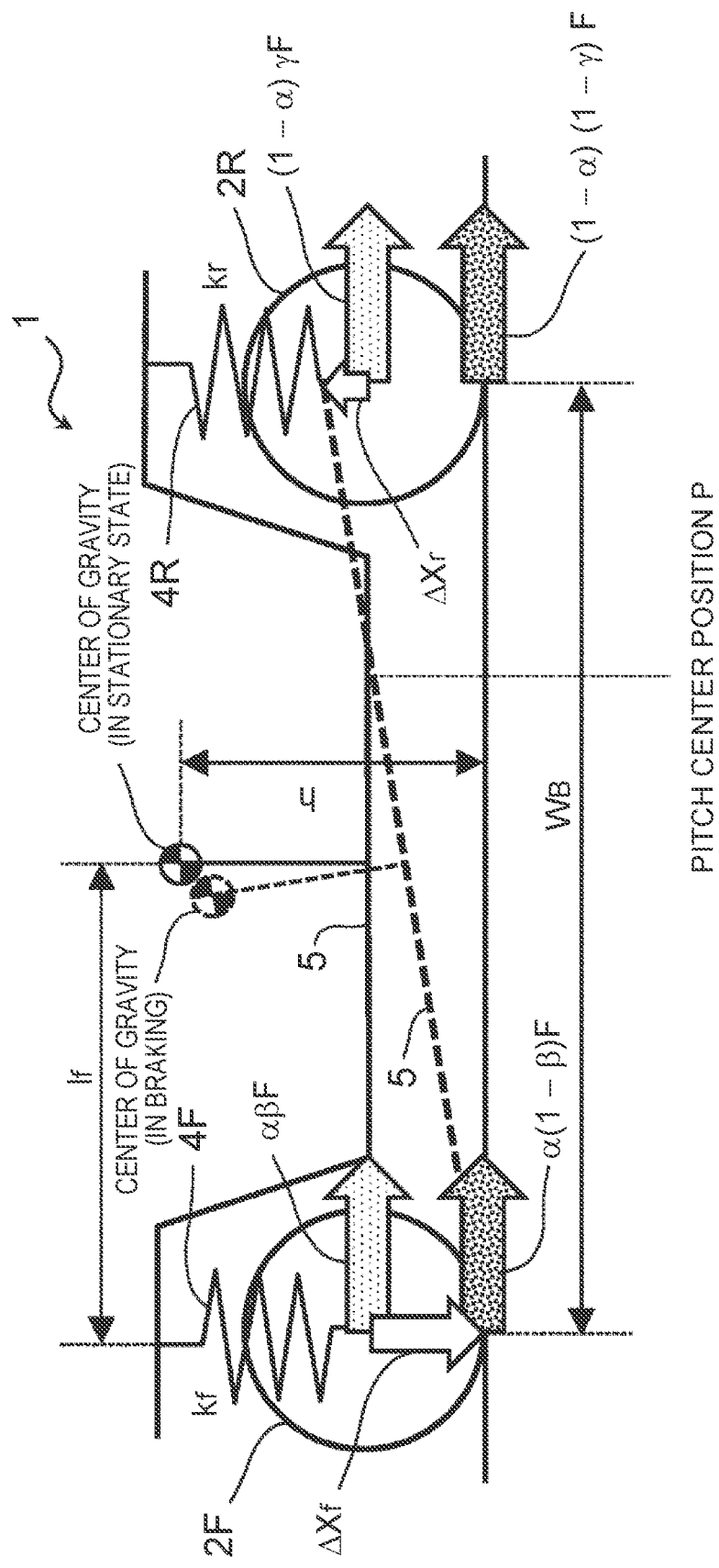
FIG. 2 is an explanatory view of a displacement amount $\Delta X_f$ of a front suspension and a displacement amount $\Delta X_r$ of a rear suspension in relation to braking force.

2-1-1. Change in Vehicle Body Braking Attitude by Change in Front-Rear Distribution Ratio FIG. 2 is an explanatory view of a displacement amount $\Delta X_f$ of the front suspension 4F and a displacement amount $\Delta X_r$ of the rear suspension 4R with respect to the braking force. The front-rear distribution ratio α of the braking force is a ratio of the front-wheel braking force to the sum (i.e., total braking force F) of the braking force applied to the front wheels 2F (front-wheel braking force) and the braking force applied to the rear wheels 2R (rear-wheel braking force). Therefore, the front-wheel braking force is αF and the rear-wheel braking force is (1−α)F.

More specifically, in an example of the vehicle 1 provided with the braking device 20 including the frictional braking device 33 and the regenerative braking device 34, the front-wheel braking force and the rear-wheel braking force are each the sum of the frictional braking force and the regenerative braking device. Here, a ratio of the front-wheel regenerative braking force to the front-wheel braking force (a front-wheel regenerative distribution ratio) is referred to as β, and a ratio of the rear-wheel regenerative braking force to the rear-wheel braking force (a ratio of rear-wheel regenerative distribution ratio) is referred to as γ. In this case, each braking force is expressed as follows:

| | |
|---|---|
| αβF | Front-wheel regenerative braking force: |
| α(1−β)F | Front-wheel frictional braking force: |
| (1−α)γF | Rear-wheel regenerative braking force: |
| (1−α)(1−γ)F | Front-wheel frictional braking force: |

FIG. 2 schematically shows suspension displacement amounts $\Delta X_f$, $\Delta X_r$ when the braking force is applied to the vehicle 1. In other words, as shown in FIG. 2, during braking, a load movement occurs, and the attitude of a vehicle body (sprung structural body) 5 changes such that the front wheel side sinks and the rear wheel side rises. Accordingly, the front-side suspension 4F is stroked toward a contraction side and the rear-side suspension 4R is stroked toward an expansion side. Such suspension displacement amounts $\Delta X_f$, $\Delta X_r$ in braking are expressed by the following expressions (1) and (2).

[Expression 1]

$$\Delta X_f = \left[\frac{h}{W_B} - \alpha\{(1-\beta) \cdot \text{AntiDive} + \beta \cdot \text{AntiLift\_f}\}\right]\frac{F}{k_f} \quad (1)$$

-continued $$\Delta X_r = -\left[\frac{h}{W_B} - (1-\alpha)\{(1-\gamma) \cdot \text{AntiLift\_r} + \gamma \cdot \text{AntiSquat}\}\right]\frac{F}{k_r} \quad (2)$$

In the expressions (1) and (2), a value $W_B$ represents a wheelbase and is known. A value h represents the height of the center of gravity when the vehicle is in a stationary state and is known. Values $k_f$, $k_r$ represent spring constants of the respective springs of the suspensions 4F, 4R, and are known.

A value AntiDive represents an anti-dive ratio. A value AntiLift_f represents a front-wheel anti-lift ratio, and a value AntiLift_r represents a rear-wheel anti-lift ratio. A value AntiSquat represents an anti-squat ratio. More precisely, the suspension 4F has a suspension geometry that generates anti-dive force and anti-lift force that are the suspension reaction force in relation to generation of the braking force. The suspension 4R has a suspension geometry that generates anti-lift force and anti-squat force that are the suspension reaction force in relation to generation of the braking force. The anti-dive ratio, the anti-lift ratio, and the anti-squat ratio in the expressions (1) and (2) are values each representing an upward-downward reaction force ratio, which is a known value determined by the specifications of the suspensions 4F, 4R.

In the expression (1), a product of $h/W_B$ and the total braking force F is related to a load movement amount of the vehicle body 5, and is equivalent to the force that causes the front wheel side of the vehicle body 5 to sink downward with the load movement. A product of the front-wheel frictional braking force α(1−β)F and AntiDive is equivalent to the force that lifts the front-wheel side of the vehicle body 5 upward with the anti-dive force that acts with the generation of the front-wheel frictional braking force α(1−β)F. A product of the front-wheel regenerative braking force αβF and AntiLift_f is equivalent to the force that lifts the front-wheel side of the vehicle body 5 upward with the anti-lift force that acts with the generation of the front-wheel regenerative braking force αβF.

In the expression (2), a product of $h/W_B$ and the total braking force F is equivalent to the force that lifts the rear wheel side of the vehicle body 5 upward with the load movement. A product of the front-wheel frictional braking force (1−α)(1−γ)F and AntiLift_r is equivalent to the force that causes the rear wheel side of the vehicle body 5 sink downward with the anti-lift force that acts with the generation of the rear-wheel frictional braking force (1−α)(1−γ)F. A product of the rear-wheel regenerative braking force (1−α)γF and AntiSquat is equivalent to the force that causes the rear wheel side of the vehicle body 5 sink downward with the anti-squat force that acts with the generation of the rear-wheel regenerative braking force (1−α)γF.

In addition, for each of the front wheels 2F and the rear wheels 2R, the frictional braking force and the regenerative braking force are different in action point from each other as shown in FIG. 2. In other words, the frictional braking force acts on the ground contact surfaces of the wheels 2. On the other hand, the regenerative torque generated by the electric motor 10F is input to the front wheels 2F via the front-wheel drive shaft 3F, and so the regenerative braking force acts on the center position of the front wheels 2F. Similarly, regenerative torque generated by the electric motor 10R is input to the rear wheels 2R via the rear-wheel drive shaft 3R, and so the regenerative braking force acts on the center position of the rear wheels 2R.

By utilizing the suspension displacement amounts $\Delta X_f$, $\Delta X_r$ obtained in the expressions (1) and (2), the pitch angle θ of the vehicle 1, the heave amount H at the center of gravity of the vehicle 1, and a pitch center position P, which change by braking, are expressed by the following expressions (3) to (5), respectively. In the expression (4), a value $l_f$ is a distance between the front-wheel drive shaft 3F and the center of gravity, and is known.

[Expression 2]

$$\theta = \tan^{-1}\frac{\Delta X_f - \Delta X_r}{W_B} \quad (3)$$

$$H = \Delta X_f + l_f \tan\theta \quad (4)$$

$$P = \frac{\Delta X_f}{\Delta X_f - \Delta X_r}W_B \quad (5)$$

Figure 3:
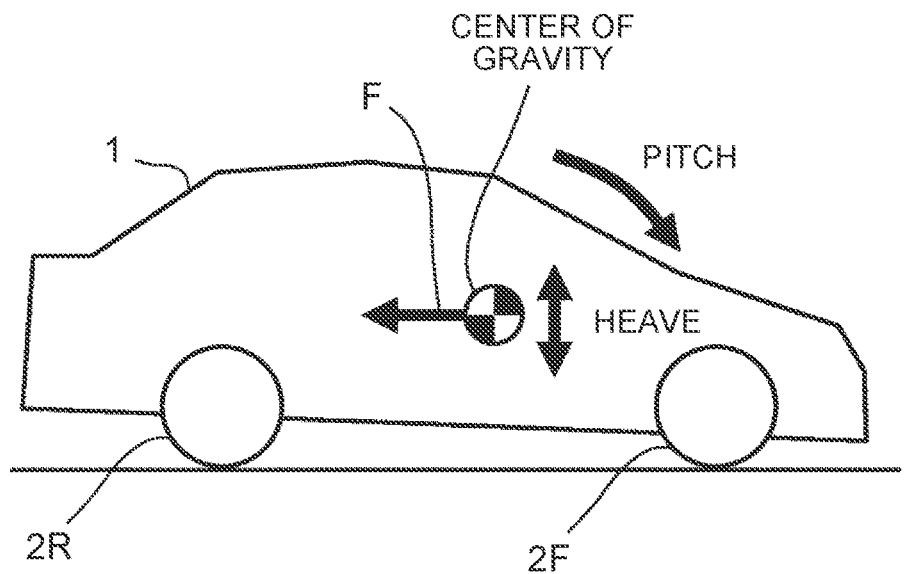
FIG. 3 shows a vehicle attitude in braking.

FIG. 3 shows the vehicle attitude (vehicle braking attitude) in braking. In braking, inertial force equal to the total braking force F acts toward the front side of the vehicle. As a result, the vehicle 1 has a change in pitch that causes the front wheel side to sink, and also has a change in heave (displacement of the vehicle body 5 in an up-down direction) as shown in FIG. 3. The way that the pitch angle θ and the heave amount H change due to braking varies when the front-rear distribution ratio α varies. This is because the suspension displacement amounts $\Delta X_f$, $\Delta X_r$ expressed by the expressions (1) and (2) change when the front-rear distribution ratio α varies.

The way that the pitch angle θ and the heave amount H change due to braking also varies by changing the rates (regenerative distribution ratio) β and γ. In the present embodiment, in an example, the rates β and γ are constant regardless of the deceleration Gx. However, in order to change the way the pitch angle θ and the heave amount H change, one of or both the rate β and γ may be changed in accordance with the deceleration Gx.

Figure 4:
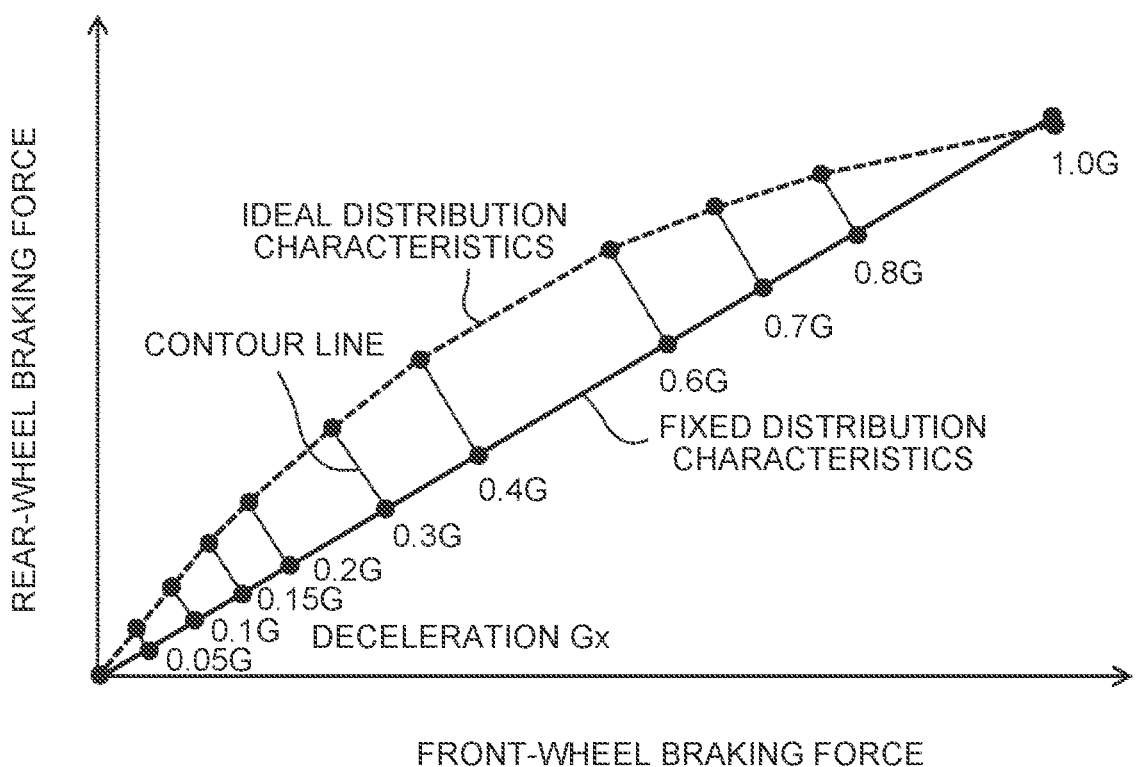
FIG. 4 shows fixed distribution characteristics and ideal distribution characteristics used for comparison of braking force distribution characteristics.
Figure 5:
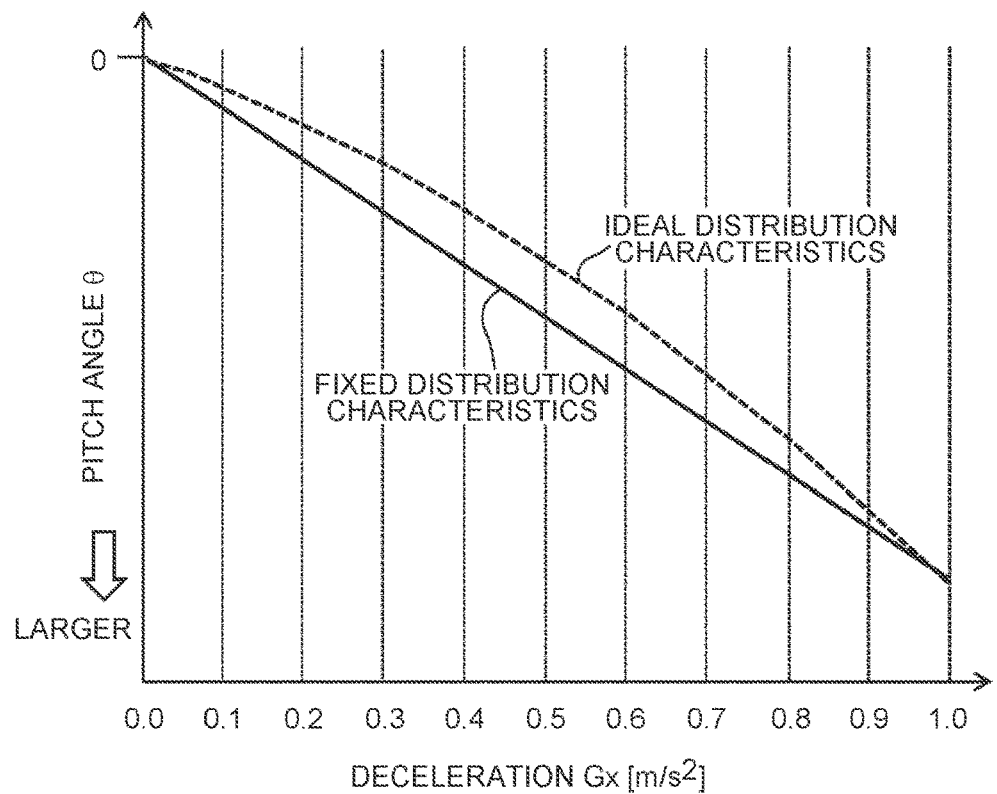
FIG. 5 shows comparison between characteristics of a pitch angle θ against deceleration Gx in the fixed distribution characteristics and in the ideal distribution characteristics.
Figure 6:
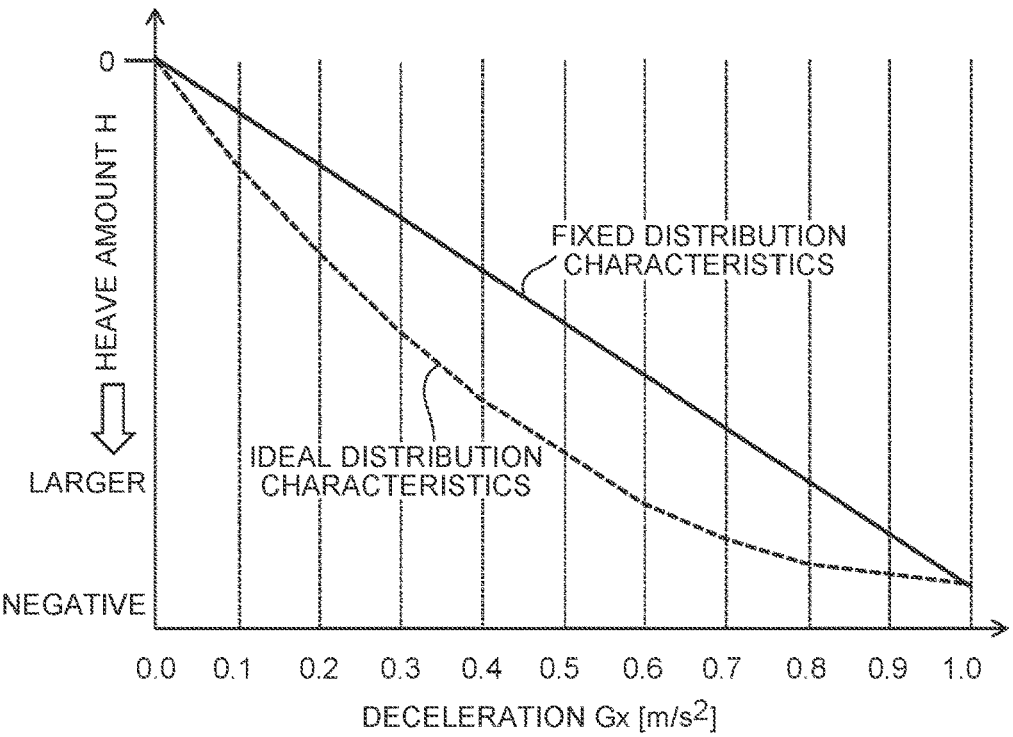
FIG. 6 shows comparison between characteristics of a heave amount H at the center of gravity against the deceleration Gx in the fixed distribution characteristics and in the ideal distribution characteristics.

Description is now given of the change in pitch angle θ and heave amount H in relation to variation in the front-rear distribution ratio α with reference to FIGS. 4 through 6. FIG. 4 shows fixed distribution characteristics and ideal distribution characteristics used for comparison of braking force distribution characteristics.

The term "fixed distribution characteristics" used herein are braking force distribution characteristics that attain the front-rear distribution ratio α that is constant regardless of the deceleration Gx of the vehicle 1. The fixed distribution characteristics are achieved, for example, by applying equal hydraulic pressure to the wheel cylinders 28a of the front wheels 2F and the rear wheels 2R. Due to the difference in braking specifications between the front and rear wheels, the fixed distribution characteristics typically provide the braking force distribution characteristics more on the front wheel side as in the case of the front-rear distribution ratio α being 0.7, for example.

The term "ideal distribution characteristics" described herein are braking force distribution characteristics for attaining the front-rear distribution ratio α that allows simultaneous locking of the front wheels 2F and the rear wheels 2R during braking. The ideal distribution characteristics can be obtained from the specifications of the vehicle 1. As shown in FIG. 4, when comparison of braking force distribution characteristics is made under the same deceleration Gx, the ideal distribution characteristics are generally the braking force distribution characteristics more on the rear wheel side than the fixed distribution characteristics.

FIG. 5 shows comparison between the characteristics of the pitch angle θ with respect to deceleration Gx in the fixed distribution characteristics and in the ideal distribution characteristics. According to the expression (3), the pitch angle θ is calculated using the calculation results of the suspension displacement amounts $\Delta X_f$, $\Delta X_r$ by the expressions (1) and (2). As a result, the pitch angle θ in the fixed distribution characteristics monotonically increases as the deceleration Gx increases. In contrast, the pitch angle θ in the ideal distribution characteristics is generally smaller than in the fixed distribution characteristics, as shown in FIG. 5. More precisely, in comparison under the same deceleration Gx, the difference in pitch angle θ is essentially larger as the difference in front-rear distribution ratio α is larger. Thus, in the case of the ideal distribution characteristics, the pitch angle θ is restrained from increasing due to the braking force distribution being more on the rear wheel side than in the case of the fixed distribution characteristics.

FIG. 6 shows comparison between the characteristics of the heave amount H at the center of gravity with respect to the deceleration Gx in the case of the fixed distribution characteristics and in the case of the ideal distribution characteristics. According to the expression (4), the heave amount H is calculated using the calculation results of the suspension displacement amounts $\Delta X_f$, $\Delta X_r$ calculated by the expressions (1) and (2) and the pitch angle θ by the expression (3). As a result, the heave amount H in the case of the fixed distribution characteristics monotonically increases as the deceleration Gx increases. In an example shown in FIG. 6, the heave amount H takes negative values with braking, i.e., the vehicle body 5 is displaced downward.

In contrast, in the case of the ideal distribution characteristics, the heave amount H is generally larger than that in the case of the fixed distribution characteristics, as shown in FIG. 6. More precisely, in comparison under the same deceleration Gx, the difference in heave amount H is essentially larger as the difference in front-rear distribution ratio α is larger. Thus, in the case of the ideal distribution characteristics, the increase of the heave amount H (sinking of the vehicle body 5) is promoted due to the braking force distribution being more on the rear wheel side as compared with the case of the fixed distribution characteristics.

As is clear from the description with reference to FIGS. 4 to 6, it is possible to control the pitch angle θ and the heave amount H by changing the front-rear distribution ratio α.

2-1-2. Braking Force Distribution Control in Consideration of Vehicle Attitude

When the deceleration Gx is generated, a load movement occurs on the vehicle body (sprung structural body) 5. With the occurrence of the load movement, a sprung attitude (vehicle attitude) changes. The change in sprung attitude in this case is caused by the influence of the load movement as well as the suspension reaction force described above. The timing when an occupant such as a driver actually receives the deceleration Gx as braking feeling (deceleration feeling) is delayed from the timing when the deceleration Gx is generated in the vehicle body 5. Specifically, it is considered that the occupant experiences the braking feeling from a combination of the generation of the deceleration Gx in the vehicle body 5 and the change in sprung attitude. More specifically, it is considered that the occupant such as a driver obtains a sense of safety for braking or, conversely, has difficulty in obtaining the deceleration feeling, depending on the way the sprung attitude change. In other words, controlling the vehicle braking attitude by changing the front-rear distribution ratio α means that the feeling that the occupant receives from braking can be changed.

As for human perception of the pitch change and the heave change, the following finding has been obtained by evaluations through prior tests and the like. According to the finding, the pitch change is easier to perceive through vision than through body feeling. In other words, it is easy for the occupant such as a driver to sense the pitch change by visual change. On the other hand, the change in heave is more perceptible through body feeling than through vision. In other words, it is easy for the occupant such as a driver to sense the heave change by bodily feeling a change in upward-downward acceleration of the vehicle or the like.

Figure 7:
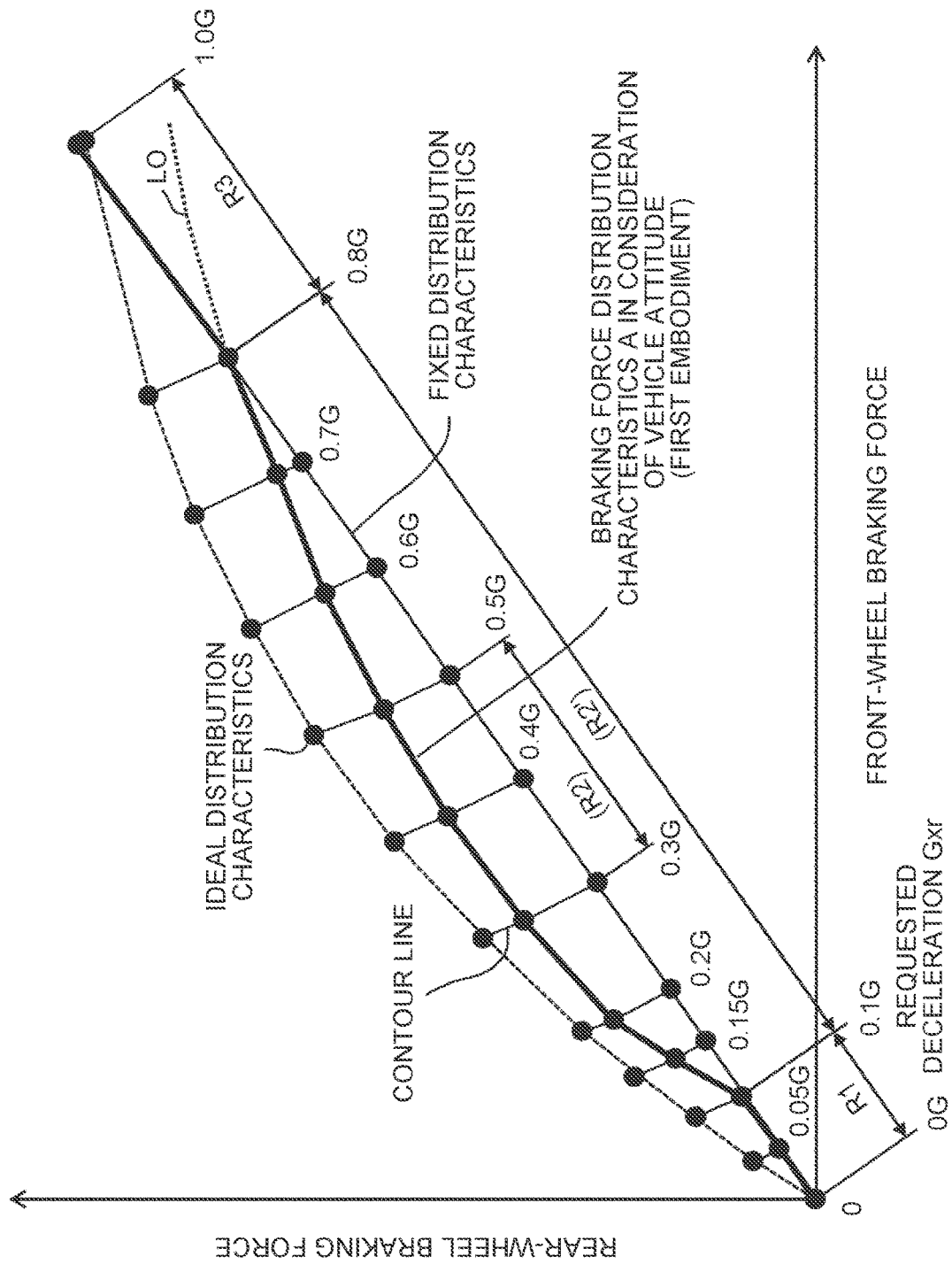
FIG. 7 is an explanatory view of braking force distribution characteristics A used in the embodiment.

FIG. 7 is an explanatory view of braking force distribution characteristics A used in the embodiment. FIG. 7 also shows the fixed distribution characteristics and ideal distribution characteristics same as in FIG. 4 for comparison with the braking force distribution characteristics A.

As mentioned above, the occupant of the vehicle 1 obtains braking feeling from the generation of the deceleration Gx as well as a combination of the generation of the deceleration Gx and the change in vehicle attitude. Therefore, in order to enhance the braking feeling (for example, deceleration feeling and a sense of safety, to be specific), it is effective to make the occupant perceive change in the vehicle braking attitude that brings about change in vision or body feeling of the occupant, which may lead to an enhanced braking feeling.

In addition, the change in the vehicle braking attitude leading to the improved braking feeling varies depending on the region of the deceleration Gx. Specifically, attention is paid to a low deceleration region R1 and a middle deceleration region R2 relating to the requested deceleration Gxr from a driver. The low deceleration region R1 and the middle deceleration region R2 correspond to examples of a "first region" and a "second region" according to the present disclosure, respectively.

The low deceleration region R1 is a region of requested deceleration that is less than a lower limit $Gx_{LMT}$ of the deceleration Gx perceivable by the occupant such as a driver. The lower limit $Gx_{LMT}$ is a value that can be attained in advance by tests or the like and takes a value of 0.1 G, for example. Alternatively, the lower limit $Gx_{LMT}$ may be 0.15 G. In the low deceleration region R1, the driver does not feel or at least hardly feels the deceleration Gx. However, when it is possible to make the driver perceive that pitch change is occurring during braking that uses the low deceleration region R1, the following effects can be achieved.

Specifically, the driver knows through experience that when the brake pedal 22 is pressed, the body, including the head, is going to move forward. As described above, the pitch change is easy to perceive by using visual change. Therefore, when the pitch change, as a change in the vehicle braking attitude that allows the driver to quickly perceive the occurrence of the pitch change, is actively generated even though the driver does not feel the deceleration Gx, it is possible to give the driver the deceleration feeling prior to perception of deceleration, by using visual change associated with the pitch change.

Therefore, according to the braking force distribution characteristics A, in the low deceleration region R1, the braking device 20 is controlled to attain the front-rear distribution ratio α along a fixed distribution ratio, as shown in FIG. 7. In other words, in the low deceleration region R1, the braking device 20 is controlled to attain the front-rear distribution ratio α more on the front wheel side than the ideal distribution characteristics.

The middle deceleration region R2 is the region of requested deceleration of 0.3 G to 0.5 G, for example. Alternatively, the middle deceleration region R2 is the region of requested deceleration of 0.3 G to 0.6 G, for example. According to the braking force distribution characteristics A, in the middle deceleration region R2, the braking device 20 is controlled to attain the front-rear distribution ratio α more on the rear wheel side than in the case of the fixed distribution characteristics, as shown in FIG. 7.

According to the braking force distribution characteristics A, in the middle deceleration region R2, the front-rear distribution ratio α is controlled based on values positioned between the ideal distribution characteristics and the fixed distribution characteristics, as shown in FIG. 7. Moreover, according to the braking force distribution characteristics A, in a requested deceleration region located between the low deceleration region R1 and the middle deceleration region R2, the front-rear distribution ratio α is gradually changed to values more on the rear wheel side, along from the values of the front-rear distribution ratio α in the region R1 to the values of the front-rear distribution ratio α in the region R2, with the increase of the requested deceleration Gxr.

In addition, there is a high deceleration region R3, which is more on a higher deceleration side than in the middle deceleration region R2. The high deceleration region R3 is a region of the requested deceleration equal to or more than the deceleration Gx when a distribution line of the braking force distribution characteristics A crosses a distribution line of the fixed distribution characteristics on the high deceleration side. Therefore, in the example shown in FIG. 7, the high deceleration region R3 is the region of the requested deceleration of 0.8 G or more. Alternatively, the high deceleration region R3 is the region of requested deceleration of 0.7 G or more, for example. The upper limit of the high deceleration region R3 is 1.0 G, for example. According to the braking force distribution characteristics A, in the high deceleration region R3, the braking device 20 is controlled to attain the front-rear distribution ratio α in conformity with the fixed distribution characteristics as shown in FIG. 7.

According to the braking force distribution characteristics A, in a requested deceleration region located between the middle deceleration region R2 and the high deceleration region R3, the front-rear distribution ratio α is gradually changed to values more on the front wheel side, along from the values of the front-rear distribution ratio α in the region R2 to the values of the front-rear distribution ratio α in the region R3, with the increase of the requested deceleration Gxr.

In addition, in each of the low deceleration region R1 and the high deceleration region R3, "controlling the braking device 20 to attain the front-rear distribution ratio α in conformity with the fixed distribution characteristics" does not necessarily require controlling the front-rear distribution ratio α so as to perfectly coincide with the fixed distribution characteristics, and rather includes controlling the braking device 20 so as to attain the front-rear distribution ratio α substantially in conformity with the fixed distribution characteristics.

The braking force distribution characteristics A (see FIG. 7) also correspond to an example of, namely, the characteristics for attaining the front-rear distribution ratio α more on the rear wheel side than "the fixed distribution characteristic in which the front-rear distribution ratio α is constant regardless of the vehicle deceleration Gx" in the low deceleration region R1 and the high deceleration region R3 corresponding to part of the requested deceleration region.

Figure 8A:
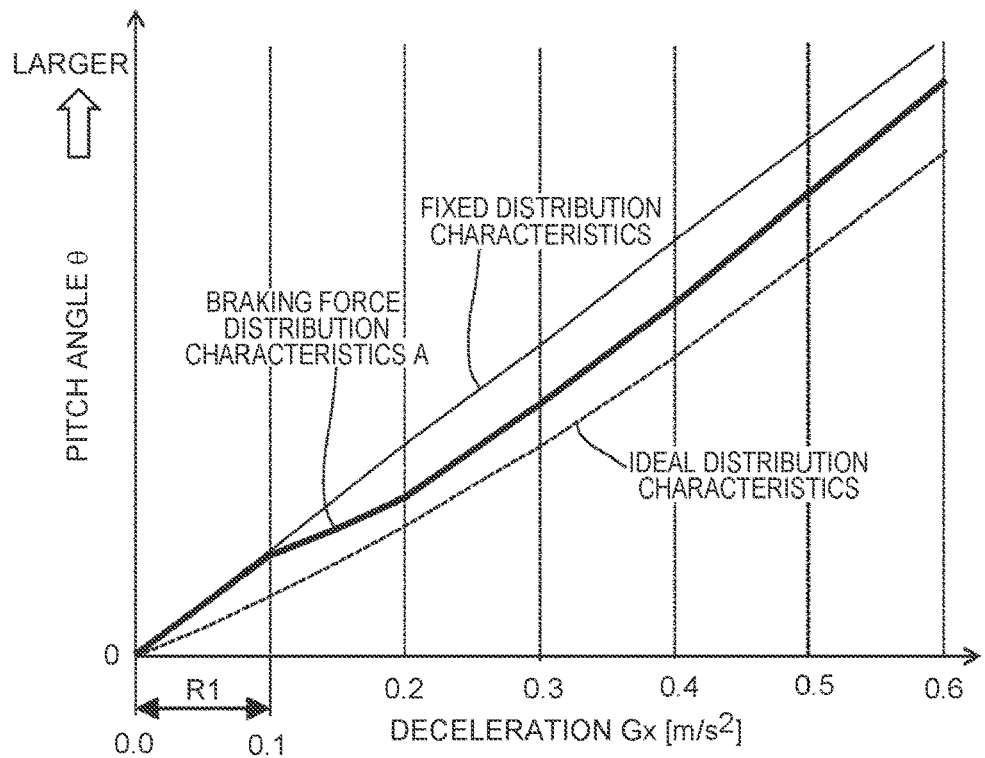
FIG. 8A is an explanatory view of the effect of the braking force distribution characteristics A used in the embodiment.
Figure 8B:
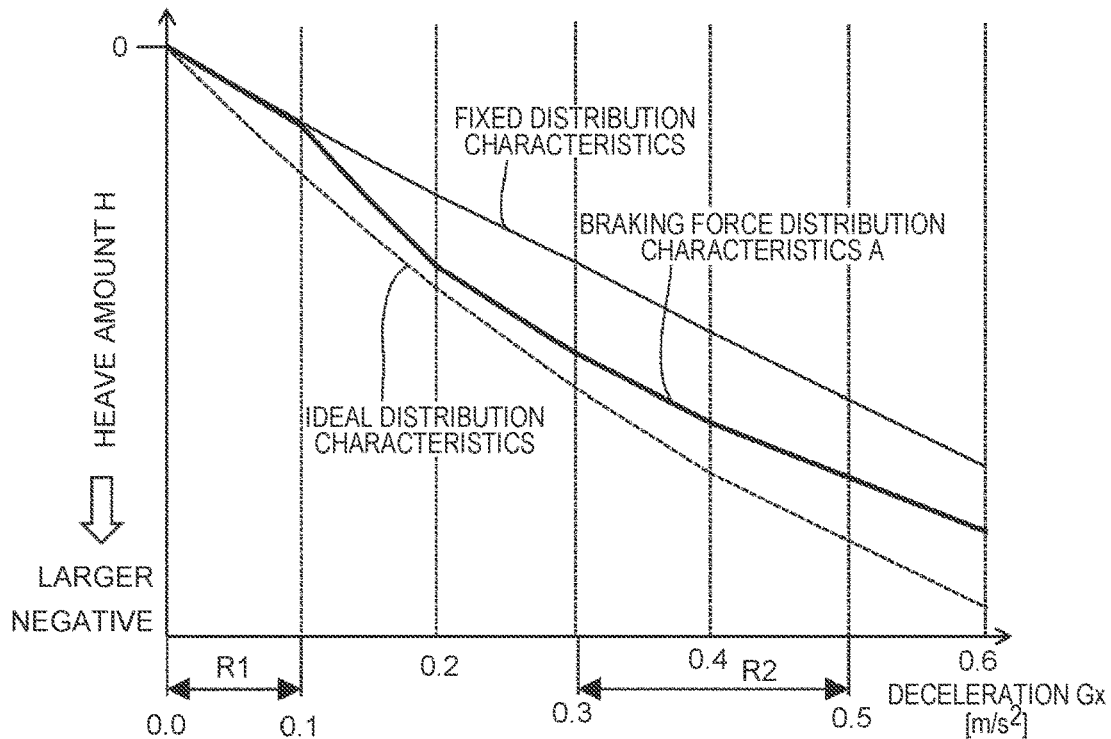
FIG. 8B is an explanatory view of the effect of the braking force distribution characteristics A used in the embodiment.

FIGS. 8A and 8B are explanatory views of the effect of the braking force distribution characteristics A according to the embodiment. FIG. 8A shows the relation between the pitch angle θ and the deceleration Gx. FIG. 8B shows the relation between the heave amount H and the deceleration Gx.

According to the braking force distribution characteristics A (see FIG. 7) of the present embodiment, in the low deceleration region R1, the braking device 20 is controlled to attain the front-rear distribution ratio α in conformity with the fixed distribution characteristics. Therefore, as shown in FIG. 8A, the pitch angle θ in the low deceleration region R1 is equivalent to the value obtained by the fixed distribution characteristics. In other words, the pitch angle θ can be made larger than the values obtained in the case of the ideal distribution characteristics. By actively generating the pitch change to be larger than in the case of the ideal distribution characteristics, it is possible to quickly notify the occupant such as a driver of the pitch change through vision. This makes it possible to give the occupant such as a driver the deceleration feeling earlier, in the low deceleration region R1 where the deceleration Gx during braking is low. More specifically, it becomes possible to give the driver a good feeling of deceleration, that is, an excellent responsiveness of the vehicle 1 to the operation of the brake pedal 22, prior to perception of the deceleration Gx, by using the perception triggered by change of vision when the head of the driver is moved due to the pitch change. This leads to improvement of the driver's sense of safety for the braking performance.

According to the braking force distribution characteristics A, in the middle deceleration region R2, the braking device 20 is controlled to attain the front-rear distribution ratio α more on the rear wheel side than in the case of the fixed distribution characteristics. Therefore, as shown in FIG. 8B, the heave amount H in the middle deceleration region R2 can be made larger than the values obtained by the fixed distribution characteristics. The heave change is notified to the occupant such as a driver as a change in acceleration in a vehicle-height direction. As described above, the heave change is easily perceived by the body feeling of the occupant. Therefore, in the middle deceleration region R2, it is possible to provide the occupant with a sense of safety (i.e., a sense of safety for braking) as if the respective wheels 2 of the vehicle 1 stick to the road surface, by actively generating an increase of the heave amount H (sinking of the vehicle body 5) as compared with the case of the fixed distribution characteristics.

In addition, as is clear from FIG. 8B, the heave change in the middle deceleration region R2 can be made larger also in the case of the ideal distribution characteristics. However, according to the ideal distribution characteristics, even in the low deceleration region R1, the front-rear distribution ratio α is more on the rear wheel side than in the case of the fixed distribution characteristics. Therefore, in the case of the ideal distribution characteristics, it is difficult to obtain the effect of giving the driver a feeling of deceleration earlier by actively generating the pitch change in the low deceleration region R1 (see FIG. 8A). Hence, in the case of the braking force distribution characteristics A, the front-rear distribution ratio α is varied between the low deceleration region R1 and the middle deceleration region R2. This makes it possible to achieve good braking force distribution characteristics capable of enhancing the deceleration feeling in the low deceleration region R1 and capable of enhancing the sense of safety for the braking in the middle deceleration region R2. Thus, with the braking force distribution characteristics A, it becomes possible to satisfactorily enhance the braking feeling in the deceleration regions (R1 and R2).

In addition, according to the braking force distribution characteristics A, in the middle deceleration region R2 where it is easier for the driver to feel the deceleration Gx since the middle deceleration region R2 is on the higher deceleration side than the low deceleration region R1, the pitch angle θ is controlled to be smaller than the pitch angle θ at the time when the fixed distribution characteristics are selected (see FIG. 8A).

Furthermore, according to the braking force distribution characteristics A, in the high deceleration region R3, the braking device 20 is controlled to attain the front-rear distribution ratio α in conformity with the fixed distribution characteristics. If the braking force distribution characteristics A should have characteristics as shown by a dashed line L0 shown in FIG. 7, then the front-rear distribution ratio α in the high deceleration region R3 is more on the front wheel side than in the case of the fixed distribution characteristics. This results in a high braking load on the front wheels 2F. In contrast, according to the braking force distribution characteristics A, in such a high deceleration region R3, the load on the front wheel braking force can be reduced as compared with the load in the case of the characteristics shown by the dashed line L0. Therefore, it is possible to satisfactorily restrain brake fade on the front wheel side and secure under-steering characteristics during braking.

In the example of the braking force distribution characteristics A shown in FIG. 7, in the entire low deceleration region R1 (first region), the braking device 20 is controlled to attain the front-rear distribution ratio α in conformity with the fixed distribution characteristics. Instead of the example, the braking device 20 may be controlled so as to attain the front-rear distribution ratio α in conformity with the fixed distribution characteristics only in part of the low deceleration region R1 (first region) as a target, in order to actively generate the pitch change so as to give the occupant the deceleration feeling earlier.

In the case of using regenerative braking force in order to change the front-rear distribution ratio α using the braking force distribution characteristics A (see FIG. 7), in-wheel motors may be used instead of the front-wheel electric motor 10F that drives the front wheels 2F via the front-wheel drive shaft 3F and the rear-wheel electric motor 10R that drives the rear wheels 2R via the rear-wheel drive shaft 3R. However, different from the central positions of the wheels 2 that are the action points in the case of using the electric motors 10F, 10R, the action points of the regenerative braking force in the case of using the in-wheel motors are ground contact surfaces of the wheels 2 which are similar to the action points in the case of the frictional braking force. Therefore, the suspension displacement amounts $\Delta X_f$, $\Delta X_r$ in the example where the in-wheel motors are used are expressed by the following expressions (6) and (7).

[Expression 3]

$$\Delta X_f = \left\{ \frac{h}{W_B} - \alpha \cdot \text{AntiDive} \right\} \frac{F}{k_f} \qquad (6)$$

$$\Delta X_r = -\left\{ \frac{h}{W_B} - (1-\alpha) \cdot \text{AntiLift\_r} \right\} \frac{F}{k_r} \qquad (7)$$

In the case of changing the front-rear distribution ratio α using the regenerative braking force, the electric motors (including the in-wheel motors) may be provided so as to drive only one of the front wheels and the rear wheels.

2-2. Issues Relating to Braking Under High Coasting Deceleration

When braking by the braking device is performed, the deceleration Gx is generated, and a resulting load movement changes the size of friction circles of the front and rear wheels. The braking force distribution characteristics in which the front-rear distribution ratio α varies in accordance with the deceleration Gx is typically determined so as to be able to perform appropriate front-rear braking force distribution under deceleration Gx generated by "braking by the braking device". In other words, braking force distribution is performed on the assumption that the deceleration Gx is generated, the deceleration Gx corresponding to the requested deceleration Gxr, based on a braking request made by the driver operating the brake pedal.

Here, when braking by the braking device is performed in the state where coasting deceleration Gxc is generated due to accelerator off regeneration, the deceleration Gx acting on the vehicle is a sum of deceleration Gxb caused by braking by the braking device and the coasting deceleration Gxc. Therefore, when braking by the braking device is performed in the deceleration state where a high coasting deceleration Gxc is generated, it may be difficult to achieve a desired front-rear distribution ratio α corresponding to the deceleration generated in the vehicle as described with reference to FIG. 9.

Figure 9:
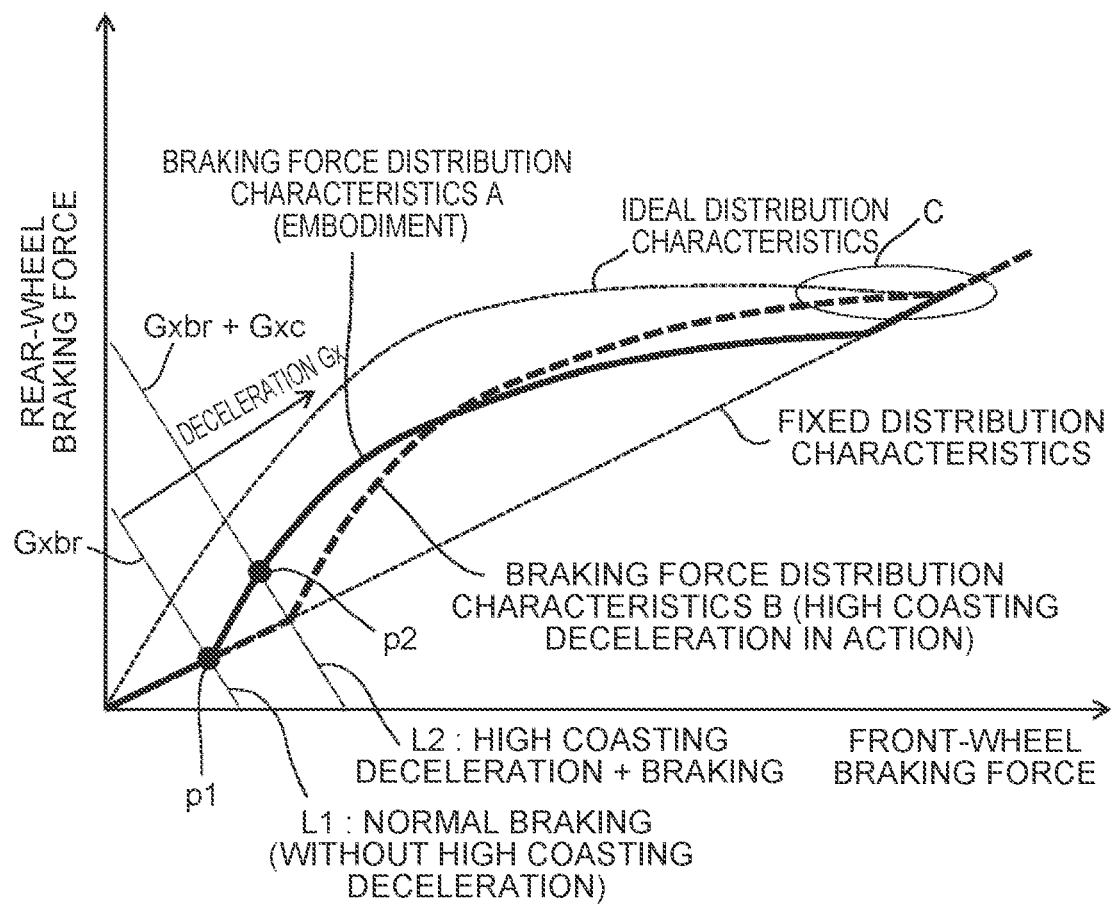
FIG. 9 is an explanatory view of issues relating to braking under high coasting deceleration.

FIG. 9 is an explanatory view of issues relating to braking under high coasting deceleration. A contour line L1 shown with "normal braking" in FIG. 9 corresponds to an example where requested deceleration Gxbr based on the brake pedal operation is requested as the requested deceleration Gxr without accelerator off regeneration. In a typical configuration X where the front-rear distribution ratio α is determined in accordance with the requested deceleration Gxbr based on the brake pedal operation, braking force distribution is performed based on the front-rear distribution ratio α corresponding to a cross point p1 between the contour line L1 and the braking force distribution characteristics A.

A contour line L2 shown with "high coasting deceleration+braking" in FIG. 9 corresponds to an example where the requested deceleration Gxbr is requested based on the brake pedal operation with the accelerator off regeneration. In this example, when the braking device generates the requested deceleration Gxbr, the deceleration Gx acting on the vehicle is a sum of the deceleration Gxb equivalent to the requested deceleration Gxbr and the coasting deceleration Gxc. Therefore, a front-rear distribution ratio α appropriate for braking force distribution in consideration of the requested deceleration Gxbr and the coasting deceleration Gxc is the front-rear distribution ratio α corresponding to a cross point p2 between the contour line L2 and the braking force distribution characteristics A.

However, in the typical configuration X, the coasting deceleration Gxc is not considered for determination of the front-rear distribution ratio α. As a result, in "coasting deceleration+braking", the value of the front-rear distribution ratio α corresponding to the cross point p1 is selected, as in "normal braking". This means that the front-rear distribution ratio α to be selected is different from an appropriate value corresponding to the vehicle deceleration Gx (=Gxbr+Gxc) on the contour line L2 to be actually generated.

Braking distribution characteristics B shown by a thick dashed line in FIG. 9 shows the characteristics obtained when the front-rear distribution ratio α is determined based solely on the requested deceleration Gxbr based on the brake pedal operation without considering the coasting deceleration Gxc, even though the coasting deceleration Gxc is generated as described above. In addition, the braking force distribution characteristics B correspond to the characteristics obtained by shifting the braking force distribution characteristics A by a portion of the coasting deceleration Gxc to the high deceleration side.

When the coasting deceleration Gxc generated before the start of braking by the braking system is high, the amount of shifting the braking force distribution characteristics from the braking force distribution characteristics A to the high deceleration side increases as in the example of the braking force distribution characteristics B shown in FIG. 9. As a result, as shown by a circle C in FIG. 9, on the high deceleration side, the front-rear distribution ratio α according to the braking force distribution characteristics B is more on the rear wheel side than in the case of the ideal distribution characteristics, which may deteriorate vehicle stability.

Furthermore, when the coasting deceleration Gxc generated before the start of braking by the braking device is high, the load movement amount generated due to the coasting deceleration Gxc increases. As a result, the coasting deceleration Gxc may adversely influence the control of the vehicle attitude during braking with use of the braking force distribution characteristics A, and so the desired vehicle attitude using the braking force distribution characteristics A may not be achieved.

Specifically, FIGS. 10A and 10B are explanatory views of the influence of the high coasting deceleration Gxc on the control of the vehicle attitude during braking with use of the braking force distribution characteristics A according to the embodiment. According to the unintended braking force distribution characteristics B shown in FIG. 9, the pitch angle θ is larger than the value achieved by the target braking force distribution characteristics A as shown in FIG. 10A. More specifically, the pitch angle θ becomes larger in a region on the higher deceleration side than in the low deceleration region R1 where active generation of the pitch change is desired. As shown in FIG. 10B, the heave amount H also becomes smaller than the desired value achieved by the braking force distribution characteristics A.

2-3. Braking Force Distribution Control (Front-Rear Braking Force Distribution)

In light of the above issues, in the present embodiment, when braking by the braking device 20 is performed in the deceleration state where the coasting deceleration Gxc is equal to or less than a prescribed threshold value TH, the ECU 40 distributes "target braking force Ft1 corresponding to requested deceleration Gxbr" to front-wheel braking force and rear-wheel braking force in accordance with a front-rear distribution ratio α1 that is determined from the requested deceleration Gxbr based on a braking request to the braking device 20 and the braking force distribution characteristics A (see FIG. 7).

On the other hand, when braking by the braking device 20 is performed in the deceleration state where the coasting deceleration Gxc is higher than the threshold value TH, the ECU 40 distributes "corrected target braking force Ft2" to the front-wheel braking force and the rear-wheel braking force in accordance with a front-rear distribution ratio α2 that is determined from total deceleration Gxtot that is a sum of the required deceleration Gxbr and the coasting deceleration Gxc and the braking force distribution characteristics A. The term "corrected target braking force" (i.e., final target braking force for the vehicle 1) Ft2 used herein corresponds to a sum of the target braking force Ft1 and the braking force Fc that generates the coasting deceleration Gxc.

Figure 11:
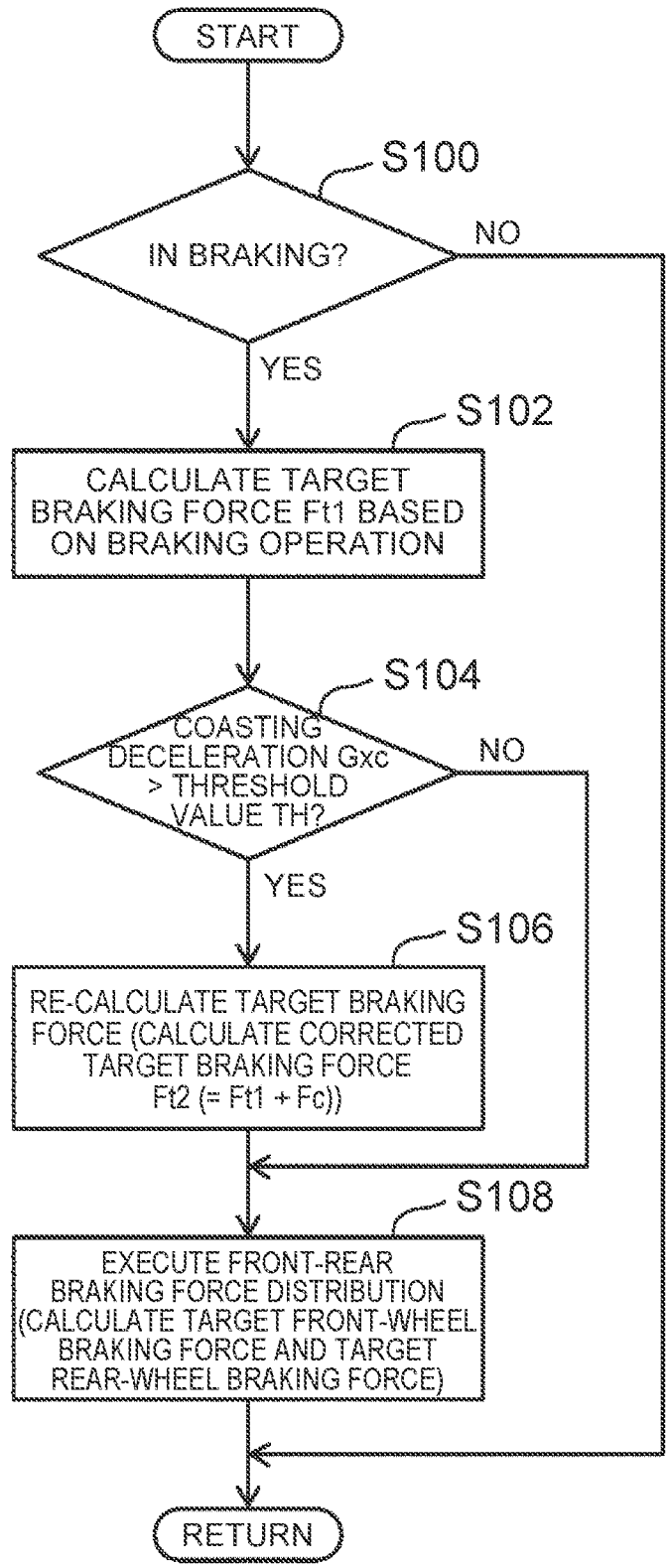
FIG. 11 is a flowchart showing a process about braking force distribution control according to the embodiment.

FIG. 11 is a flowchart showing a process about braking force distribution control according to the embodiment. The process in the flowchart is repeatedly executed while the vehicle 1 travels.

In FIG. 11, in step S100, the ECU 40 determines whether or not the vehicle 1 is in braking (braking by the braking device 20 to be specific). The determination can be made, for example, based on whether or not the pressing amount of the brake pedal 22 detected by the brake position sensor 48 is a prescribed threshold value or more.

As a result, when the vehicle 1 is not in braking in step S100, the process is returned. When the vehicle 1 is in braking, the process proceeds to step S102.

In step S102, the ECU 40 calculates the target braking force Ft1 (a target value of the total braking force F), based on a braking request by the operation of the brake pedal 22. In other words, the target braking force Ft1 is equivalent to the target braking force corresponding to the requested deceleration Gxr to the braking device 20. More specifically, the ECU 40 calculates the requested deceleration Gxbr based on, for example, the pressing amount of the brake pedal 22 or the master cylinder pressure. The ECU 40 then calculates the target braking force Ft1 corresponding to the calculated requested deceleration Gxbr. More specifically, the target braking force Ft1 can be calculated from a map that defines the relationship between the requested deceleration Gxbr and the target braking force Ft1, for example.

Then, in step S104, the ECU 40 determines whether or not the coasting deceleration Gxc, immediately before the start of braking by the braking device 20, is higher than the threshold value TH. The ECU 40 constantly acquires deceleration Gx, which is acquired using the longitudinal acceleration sensor 44 during a coasting travel while the accelerator pedal 50 and the brake pedal 22 are set to off, as the deceleration of Gxc, for example. Then the coasting deceleration Gxc at the start of braking (at the moment when the pressing amount of the brake pedal 22 reaches the threshold value (step S100) during the coasting travel) is used as the coast deceleration Gxc immediately before braking by the braking device 20, for example. The threshold value TH is 0.07 G, for example.

In addition, the "threshold value TH equivalent to 0.07 G" used herein corresponds to a maximum value of the coasting deceleration Gxc that can be generated by engine braking in a conventional vehicle provided with a spark ignition-type internal combustion engine such as a gasoline engine, during the coasting travel while the accelerator pedal (and the brake pedal) is set to off.

When the determination result in step S104 is "Yes" (i.e., when braking by the braking device 20 is performed in the deceleration state where the coasting deceleration Gxc is higher than the threshold value TH), the process proceeds to step S106.

In step S106, the ECU 40 performs re-calculation of the target braking force. Specifically, the ECU 40 calculates the corrected target braking force Ft2 by adding the target braking force Ft1 calculated in step S102 and the braking force Fc that generates the coasting deceleration Gxc. The braking force Fc used in this calculation can be calculated based on, for example, a map that defines the relationship between the coasting deceleration Gxc and the braking force Fc.

Meanwhile, when the determination result in step S104 is "No" (i.e., when braking by the braking device 20 is performed in the deceleration state where the coasting deceleration Gxc is equal to or less than the threshold value TH), the process skips step S106 and proceeds to step S108.

When no accelerator off regeneration is performed, the coasting deceleration Gxc takes a value close to 0 G, and so the determination result becomes "No". In addition, the process of step S104 indicates that when the coasting deceleration Gxc is within the range that can be expected in conventional vehicles, then it can be said that the magnitude of the generated coasting deceleration Gxc is market proven. Therefore, the ECU 40 determines that the measure of re-calculation of the target braking force is not necessary.

Then, in step S108, the ECU 40 executes the front-rear braking force distribution. Specifically, the ECU 40 calculates the front-wheel braking force and the rear-wheel braking force to be distributed based on the target braking force Ft (target braking force Ft1 or the corrected target braking force Ft2) and the front-rear distribution ratio α in accordance with the required deceleration Gxr (requested deceleration Gxbr or total deceleration Gxtot).

Figure 12:
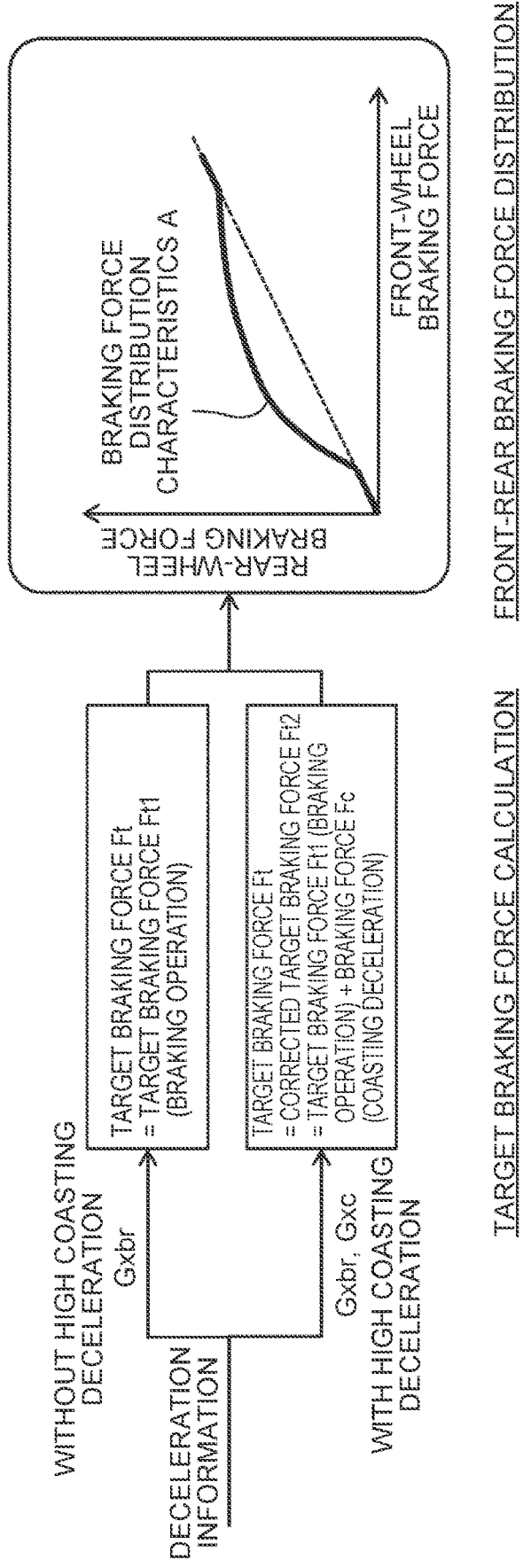
FIG. 12 is a block diagram showing a process flow about front-rear braking force distribution in steps S102 to S108 shown in FIG. 11.

FIG. 12 is a block diagram showing a process flow of the front-rear braking force distribution in steps S102 to S108 shown in FIG. 11.

First, when the coasting deceleration Gxc is equal to or less than the threshold value TH (without high coasting deceleration), the requested deceleration Gxbr based on the operation of the brake pedal 22 (i.e., based on the braking request to the braking device 20) is used as deceleration information for calculating the target braking force Ft1 as shown in FIG. 12 (see step S102).

In this state, in the case without coasting deceleration, the target front-wheel braking force α1·Ft1 and the target rear-wheel braking force (1−α1)·Ft1 are calculated based on the target braking force Ft1 and the front-rear distribution ratio α1 in the front-rear braking force distribution in step S108. The front-rear distribution ratio α1 used in the calculation is a value determined from the requested deceleration Gxbr and the braking force distribution characteristics A (see FIG. 7). More specifically, the front-rear distribution ratio α1 is calculated as a value corresponding to the requested deceleration Gxbr based on the map that defines the relationship between the deceleration Gx and the front-rear distribution ratio α so as to satisfy the braking force distribution characteristics A, for example.

When the coasting deceleration Gxc is higher than the threshold value TH (with high coasting deceleration), then the coasting deceleration Gxc is used together with the requested deceleration Gxbr as the deceleration information to calculate the corrected target braking force Ft2, as shown in FIG. 12 (see step S106).

In this state, in the case with high coasting deceleration, the target front-wheel braking force α2·Ft2 and the target rear-wheel braking force (1−α2)·Ft2 are calculated based on the corrected target braking force Ft2 and the front-rear distribution ratio α2 in the front-rear braking force distribution in step S108. The front-rear distribution ratio α2 used in the calculation is a value determined from the total deceleration Gxtot (=Gxbr+Gxc) and the braking force distribution characteristics A (see FIG. 7). More specifically, the front-rear distribution ratio α2 is calculated as a value corresponding to the total deceleration Gxtot (i.e., the final requested deceleration Gxr) based on the map that defines the relationship between the deceleration Gx and the front-rear distribution ratio α so as to satisfy the braking force distribution characteristics A, for example.

Then, in step S108, the ECU 40 controls the braking device 20 so as to generate the calculated target front-wheel braking force (α1·Ft1 or α2·Ft2) and the target rear-wheel braking force ((1−α1)·Ft1 or (1−α2)·Ft2). More specifically, as described above, the rates (regenerative distribution ratios) β and γ in the present embodiment are constant in an example. The target front-wheel braking force is distributed to the target front-wheel frictional braking force and the target front-wheel regenerative braking force based on the rate β. The target rear-wheel braking force is distributed to the target rear-wheel frictional braking force and the target rear-wheel regenerative braking force based on the rate γ. The ECU 40 controls the braking device 20 (the frictional braking device 33 and the regenerative braking device 34) to generate the target frictional braking force and the target regenerative braking force, respectively.

3. EFFECTS

As described in the foregoing, in the present embodiment, when braking by the braking device 20 is performed in the deceleration state where the coasting deceleration Gxc is higher than the threshold value TH, the front-rear braking force distribution is performed as follows. Specifically, the corrected target braking force Ft2 (=Ft1+Fc) is distributed to the front-wheel braking force and the rear-wheel braking force in accordance with the front-rear distribution ratio α2, which is determined from the total deceleration Gxtot (=Gxbr+Gxc) and the braking force distribution characteristics A. Therefore, even when a high coasting deceleration Gxc is generated before the start of braking by the braking device 20 (i.e., regardless of the magnitude of the coasting deceleration Gxc), it becomes possible to satisfactorily attain the desired braking force distribution characteristics (braking force distribution characteristics A in the present embodiment).

As described in the foregoing, the braking force distribution characteristics A correspond to an example of the characteristics that can provide the front-rear distribution ratio α more on the rear wheel side than in the case of the "fixed distribution characteristics" in a region R2' (see FIG. 7) corresponding to part of the requested deceleration region. The method of the front-rear braking force distribution of the present embodiment, for use under the high coasting deceleration, can restrain excessive distribution of braking force to the rear wheels 2R due to the action of the high coasting deceleration (the issue shown in FIG. 9) when the braking force distribution characteristics A are used. Therefore, even when the braking force distribution characteristics A are used, it is possible to restrain deterioration of the vehicle stability during braking under the high coasting deceleration.

Moreover, according to the braking force distribution characteristics A, as described with reference to FIGS. 8A and 8B, the vehicle attitude during braking is appropriately controlled in accordance with the deceleration Gx. Therefore, the braking feeling can satisfactorily be improved in a plurality of deceleration regions (R1 and R2). According to the method of front-rear braking force distribution of the present embodiment used under the high coasting deceleration, it becomes possible to achieve an appropriate vehicle attitude in accordance with the deceleration Gx even under the high coasting deceleration when the braking force distribution characteristics A is used.

4. MODIFICATIONS RELATING TO CALCULATION METHOD OF TARGET BRAKING FORCE

In the embodiment disclosed, the calculation method of the target braking force is changed depending on whether or not the coasting deceleration Gxc is higher than the threshold value TH. Instead of the example, the target braking force may be calculated by constantly taking the coasting deceleration Gxc into consideration, as described below.

FIG. 13 is a block diagram showing a process flow about the front-rear braking force distribution according to a modification of the embodiment. In the modification, when braking by the braking device 20 is performed, the ECU 40 distributes the corrected target braking force Ft2 (=Ft1+Fc) to the front-wheel braking force and the rear-wheel braking force in accordance with the front-rear distribution ratio α, which is determined from the total deceleration Gxtot (=Gxbr+Gxc) and the braking force distribution characteristics A, regardless of the presence or absence and the magnitude of the coasting deceleration Gxc.

Specifically, the ECU 40 constantly acquires deceleration Gx, which is acquired using the longitudinal acceleration sensor 44 during a coasting travel while the accelerator pedal 50 and the brake pedal 22 are set to off, as the coasting deceleration Gxc. Then, the coasting deceleration Gxc at the timing immediately before the start of braking by the braking device 20 (for example, at the start of braking) is used together with the requested deceleration Gxbr, as the deceleration information for calculating the target braking force Ft (corrected target braking force Ft2), as shown in FIG. 13.

The method of calculating the corrected target braking force Ft2 and the method of distributing the calculated corrected target braking force Ft2 to the front-wheel braking force and the rear-wheel braking force in accordance with the front-rear distribution ratio α determined from the total deceleration Gxtot and the braking force distribution characteristics A are the same as described with reference to FIG. 12. In FIG. 13, when accelerator off regeneration is not performed, the coasting deceleration Gxc takes a value close to 0 G, and so the braking force Fc to generate the coasting deceleration Gxc is calculated to be zero. Therefore, the calculated corrected target braking force Ft2 in this case is equal to the target braking force Ft1.

FIG. 14 is a flowchart showing a process about braking force distribution control according to the modification of the embodiment. The process in the flowchart is repeatedly executed while the vehicle 1 travels.

In FIG. 14, when the ECU 40 determines that the vehicle is in braking in step S100, the process proceeds to step S200. In step S200, the ECU 40 calculates the corrected target braking force Ft2 using the method described with reference to FIG. 13.

Next, in step S202, the ECU 40 calculates the target front-wheel braking force α·Ft2 and the target rear-wheel braking force (1−α)·Ft2, which are distributed based on the front-rear distribution ratio α corresponding to the corrected target braking force Ft2 calculated in step S200 and the total deceleration Gxtot. Then, the ECU 40 controls the braking device 20 so as to generate the calculated target front-wheel braking force α·Ft2 and the target rear-wheel braking force ((1−α)·Ft2).

The above-described modification also demonstrates the same effects as the embodiment disclosed.

5. OTHER EXAMPLES OF BRAKING FORCE DISTRIBUTION CHARACTERISTICS

As the "braking force distribution characteristics in which the front-rear distribution ratio of wheel braking force vary" according to the present disclosure, the ideal distribution characteristics (see FIG. 4) may be used instead of the braking force distribution characteristics A (see FIG. 7), for example. The ideal distribution characteristics, together with the braking force distribution characteristics A, correspond to an example of the "characteristics that provide the front-rear distribution ratio that is more on a rear wheel side than in a case of fixed distribution characteristics in which the front-rear distribution ratio is constant regardless of the vehicle deceleration, in at least part of the requested deceleration region".

In addition, the braking force distribution characteristics that correspond to the "braking force distribution characteristics in which the front-rear distribution ratio of the wheel braking force varies depending on vehicle deceleration" according to the present disclosure are not limited to the characteristics that provide the front-rear distribution characteristics more on the rear wheel side than in the case of the fixed distribution characteristics, as in the example of the braking force distribution characteristics A and the ideal distribution characteristics, and may be the "characteristics that provide the front-rear distribution ratio more on the front wheel side than in the case of the fixed distribution characteristics at least in part of the requested deceleration region".

6. OTHER EXAMPLES OF DECELERATOR

The "decelerator" that generates the coasting deceleration is not limited to those using the regenerative braking by the configuration including the electric motors 10F, 10R, the inverter 32, and the battery 12. Specifically, the decelerator may be any device as long as the device can generate the coasting deceleration during a coasting travel with the acceleration pedal being set to off and can generate a load movement of the vehicle in accordance with the generated coasting deceleration. Therefore, the decelerator may be, for example, an aerodynamic device, such as mobile spoilers or wings, mounted on at least one of the front part and the rear part of the vehicle body.

What is claimed is:

1. A vehicle, comprising:
   a braking device configured to change a front-rear distribution ratio of wheel braking force in accordance with braking force distribution characteristics in which the front-rear distribution ratio varies depending on vehicle deceleration;
   a decelerator configured to generate coasting deceleration; and
   an electronic control unit configured to control the braking device and the decelerator, wherein
   the electronic control unit is configured to, when braking by the braking device is performed in a deceleration state where the coasting deceleration is equal to or less than a threshold value, distribute target braking force corresponding to requested deceleration to front-wheel braking force and rear-wheel braking force in accordance with a front-rear distribution ratio that is determined from the requested deceleration based on a braking request to the braking device and the braking force distribution characteristics, and
   the electronic control unit is configured to, when the braking is performed in a deceleration state where the coasting deceleration is higher than the threshold value, distribute corrected target braking force that is a sum of the target braking force and braking force that generates the coasting deceleration to the front-wheel braking force and the rear-wheel braking force, in accordance with the front-rear distribution ratio determined from a total deceleration that is a sum of the requested deceleration and the coasting deceleration and the braking force distribution characteristics.

2. A vehicle, comprising:
   a braking device configured to change a front-rear distribution ratio of wheel braking force in accordance with braking force distribution characteristics in which the front-rear distribution ratio varies depending on vehicle deceleration;
   a decelerator configured to generate coasting deceleration; and
   an electronic control unit configured to control the braking device and the decelerator, wherein
   the electronic control unit is configured to, when braking by the braking device is performed, distribute corrected target braking force to front-wheel braking force and rear-wheel braking force in accordance with total deceleration that is a sum of requested deceleration based on a braking request to the braking device and the coasting deceleration and the front-rear distribution characteristics, the corrected target braking force being a sum of target braking force corresponding to the requested deceleration and braking force that generates the coasting deceleration.

3. The vehicle according to claim 1, wherein the braking force distribution characteristics are characteristics that provide the front-rear distribution ratio that is more on a rear wheel side than in a case of fixed distribution characteristics in which the front-rear distribution ratio is constant regardless of the vehicle deceleration, in at least part of a requested deceleration region.

4. The vehicle according to claim 1, wherein the braking force distribution characteristics are characteristics that include fixed distribution characteristics in which the front-rear distribution ratio is constant regardless of the vehicle deceleration in at least part of a first region that is a requested deceleration region less than a lower limit of vehicle deceleration perceptible by an occupant and that provide the front-rear distribution ratio that is more on a rear-wheel side than in a case of the fixed distribution characteristics in a second region higher in vehicle deceleration than in the first region.

5. A vehicle control method of controlling a vehicle, the vehicle including a braking device configured to change a front-rear distribution ratio of wheel braking force in accordance with braking force distribution characteristics in which the front-rear distribution ratio varies depending on vehicle deceleration, and a decelerator configured to generate coasting deceleration, the vehicle control method comprising:
   distributing, when braking by the braking device is performed in a deceleration state where the coasting deceleration is equal to or less than a threshold value, target braking force corresponding to requested deceleration to front-wheel braking force and rear-wheel braking force in accordance with a front-rear distribution ratio that is determined from the requested deceleration based on a braking request to the braking device and the braking force distribution characteristics; and
   distributing, when braking is performed in a deceleration state where the coasting deceleration is higher than the threshold value, corrected target braking force that is the sum of the target braking force and braking force that generates the coasting deceleration to the front-wheel braking force and the rear-wheel braking force in accordance with the front-rear distribution ratio determined from a total deceleration that is a sum of the requested deceleration and the coasting deceleration and the braking force distribution characteristics.

6. A vehicle control method of controlling a vehicle, the vehicle including a braking device configured to change a front-rear distribution ratio of wheel braking force in accordance with braking force distribution characteristics in which the front-rear distribution ratio varies depending on vehicle deceleration, and a decelerator configured to generate coasting deceleration, the vehicle control method comprising
distributing, when braking by the braking device is performed, corrected target braking force to front-wheel braking force and rear-wheel braking force in accordance with total deceleration that is a sum of requested deceleration based on a braking request to the braking device and the coasting deceleration and the braking force distribution characteristics, the corrected target braking force being a sum of target braking force corresponding to the requested deceleration and braking force that generates the coasting deceleration.

7. The vehicle according to claim 2, wherein the braking force distribution characteristics are characteristics that provide the front-rear distribution ratio that is more on a rear wheel side than in a case of fixed distribution characteristics in which the front-rear distribution ratio is constant regardless of the vehicle deceleration, in at least part of a requested deceleration region.

8. The vehicle according to claim 2, wherein the braking force distribution characteristics are characteristics that include fixed distribution characteristics in which the front-rear distribution ratio is constant regardless of the vehicle deceleration in at least part of a first region that is a requested deceleration region less than a lower limit of vehicle deceleration perceptible by an occupant and that provide the front-rear distribution ratio that is more on a rear-wheel side than in a case of the fixed distribution characteristics in a second region higher in vehicle deceleration than in the first region.

* * * * *